(12) United States Patent
Muhammad et al.

(10) Patent No.: US 12,501,504 B2
(45) Date of Patent: Dec. 16, 2025

(54) PREVENTING REESTABLISHMENT AT DESCENDANT NODES WITH NO ALTERNATIVE PATHS IN INTEGRATED ACCESS BACKHAUL

(71) Applicant: Telefonaktiebolaget LM Ericsson (publ), Stockholm (SE)

(72) Inventors: Ajmal Muhammad, Sollentuna (SE); Oumer Teyeb, Montréal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 583 days.

(21) Appl. No.: 17/915,893

(22) PCT Filed: Mar. 30, 2021

(86) PCT No.: PCT/EP2021/058254
§ 371 (c)(1),
(2) Date: Sep. 29, 2022

(87) PCT Pub. No.: WO2021/198232
PCT Pub. Date: Oct. 7, 2021

(65) Prior Publication Data
US 2023/0143694 A1    May 11, 2023

Related U.S. Application Data

(60) Provisional application No. 63/004,317, filed on Apr. 2, 2020.

(51) Int. Cl.
*H04W 76/19* (2018.01)
*H04L 45/00* (2022.01)
(Continued)

(52) U.S. Cl.
CPC ............. *H04W 76/19* (2018.02); *H04L 45/22* (2013.01); *H04W 24/04* (2013.01); *H04W 36/305* (2018.08)

(58) Field of Classification Search
None
See application file for complete search history.

(56) References Cited

U.S. PATENT DOCUMENTS

| 8,254,943 B1 | 8/2012 | Dinan et al. |
| 2016/0119821 A1* | 4/2016 | Ramachandran ..... H04L 45/507 370/392 |

(Continued)

FOREIGN PATENT DOCUMENTS

WO    2020165275 A1    8/2020

OTHER PUBLICATIONS

International Search Report and Written Opinion dated Jun. 29, 2021 for International Application No. PCT/EP2021/058254 filed Mar. 30, 2021; consisting of 12 pages.

(Continued)

*Primary Examiner* — Saumit Shah
(74) *Attorney, Agent, or Firm* — Weisberg I.P. Law, P.A.

(57) ABSTRACT

A method, system and apparatus are disclosed for preventing reestablishment at descendant nodes with no alternative paths in Integrated Access Backhaul (IAB) networks. In one embodiment, a method implemented in a network node configured to communicate with at least one descendant node over a backhaul network includes transmitting an indication to the at least one descendant network node in which the indication is associated with a radio link failure; and receiving at least one message in response to the indication, the at least one message being associated with an alternative path availability of the at least one descendant network node toward a third network node.

15 Claims, 14 Drawing Sheets

(51) Int. Cl.
*H04W 24/04* (2009.01)
*H04W 36/30* (2009.01)

(56) References Cited

U.S. PATENT DOCUMENTS

| | | | | |
|---|---|---|---|---|
| 2020/0092784 A1* | 3/2020 | Hampel | ................ | H04W 76/27 |
| 2021/0195674 A1* | 6/2021 | Park | ...................... | H04W 76/18 |
| 2021/0378041 A1* | 12/2021 | Narasimha | ............ | H04W 76/19 |
| 2022/0191960 A1* | 6/2022 | Wu | ........................ | H04W 76/19 |
| 2022/0217598 A1* | 7/2022 | Ishii | ................. | H04W 36/0058 |
| 2022/0386404 A1* | 12/2022 | Fujishiro | ............... | H04W 40/22 |

OTHER PUBLICATIONS

3GPP TSG-RAN WG2 Meeting #109-e R2-2000273, Revision of R2-1914920; Title: Discussion on IAB BH RLF report mechanism in case of DC; Source: vivo: Agenda Item: 6.1.5.1; Document for: Discussion and Decision; Date and Location: Feb. 28-Mar. 6, 2020, Electronic Meeting; consisting of 3 pages.

3GPP TSG-RAN WG2#109 electronic R2-2000509; Title: Discussion on IAB BH RLF handling; Source: ZTE, Banechips; Agenda item: 6.1.5; Document for: Discussion and Approval; Date and Location: Feb. 24-Mar. 6, 2020; consisting of 5 pages.

3GPP TSG-RAN WG2 Meeting #104 R2-1819125; Title: TR 38.874, Version 0.7.0; Source: Qualcomm Incorporated (Rapporteur); Agenda Item: 11.1.1—Study on Integrated Access and Backhaul for NR; Release: Rel-15; Document for: Information; Date and Location: Nov. 12-16, 2018, Spokane, WA, USA; consisting of 112 pages.

3GPP TR 38.874 V0.7.0; 3rd Generation Partnership Project; Technical Specification Group Radio Access Network; Study on Integrated Access and Backhaul; (Release 15); Nov. 2018, consisting of 111-pages.

3GPP TR 38.331 V15.3.0; 3rd Generation Partnership Project; Technical Specification Group Radio Access Network; NR; Radio Resource Control (RRC) protocol specification (Release 15); Sep. 2018, consisting of 445-pages.

3GPP TSG RAN Meeting #82 RP-182882 (Revision of RP-182810); Title: New WID: Integrated Access and Backhaul for NR; Agenda Item: 9.1.2; Source: Qualcomm; Document for: Approval; Date and Location: Dec. 10-13, 2018, Sorrento, Italy, consisting of 7-pages.

* cited by examiner

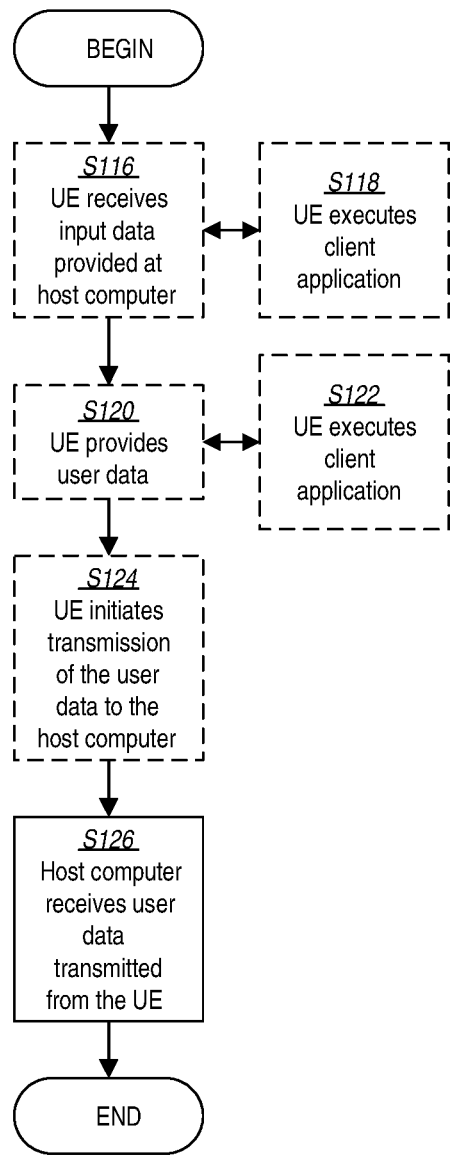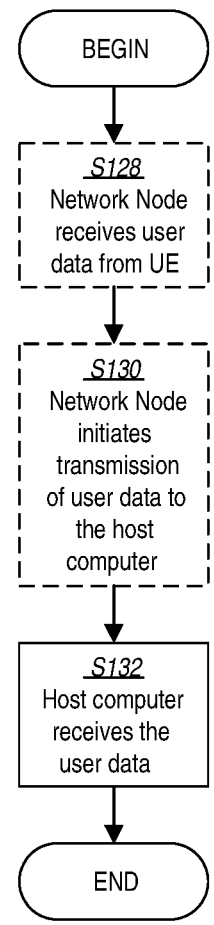
FIG. 11
FIG. 12

Transmit an indication to the at least one descendant network node, the indication associated with a radio link failure
S148

Receive at least one message in response to the indication, the at least one message associated with an alternative path availability of the at least one descendant network node toward a third network node
S150

FIG. 15

Receive, from the second network node, an indication associated with a radio link failure
S152

Transmit at least one message to the second network node in response to the indication, the at least one message associated with an alternative path availability of the first network node toward a third network node
S154

FIG. 16

PREVENTING REESTABLISHMENT AT DESCENDANT NODES WITH NO ALTERNATIVE PATHS IN INTEGRATED ACCESS BACKHAUL

CROSS-REFERENCE TO RELATED APPLICATIONS

This application is a Submission Under 35 U.S.C. § 371 for U.S. National Stage Patent Application of International Application No.: PCT/EP2021/058254, filed Mar. 30, 2021 entitled "PREVENTING REESTABLISHMENT AT DESCENDANT NODES WITH NO ALTERNATIVE PATHS IN INTEGRATED ACCESS BACKHAUL," which claims priority to U.S. Provisional Application No. 63/004,317, filed Apr. 2, 2020, entitled "PREVENTING REESTABLISHMENT AT DESCENDANT NODES WITH NO ALTERNATIVE PATHS IN INTEGRATED ACCESS BACKHAUL," the entireties of both of which are incorporated herein by reference.

FIELD

The present disclosure relates to wireless communications, and in particular, to arrangements for preventing reestablishment at descendant nodes with no alternative paths in Integrated Access Backhaul (IAB) networks.

BACKGROUND

Integrated Access Backhaul Networks

The Third Generation Partnership Project (3GPP) is currently standardizing integrated access and wireless access backhaul (IAB) in 3GPP New Radio (NR, also called 5$^{th}$ Generation or 5G) in 3GPP Release 16 (Rel-16) (RP-RP-182882).

The usage of short range millimeter wave (mmWave) spectrum in NR may result in a densified deployment with multi-hop backhauling. However, optical fiber to every base station may be too costly and sometimes not even possible (e.g., historical sites). One main IAB principle is the use of wireless links for the backhaul (instead of fiber) to enable flexible and very dense deployment of cells without the need for densifying the transport network. Use case scenarios for IAB can include e.g., coverage extension, deployment of massive number of small cells and fixed wireless access (FWA) (e.g., to residential/office buildings). The larger bandwidth available for NR in mmWave spectrum may provide an opportunity for self-backhauling, without limiting the spectrum to be used for the access links. On top of that, the inherent multi-beam and multiple-input multiple-output (MIMO) support in NR may reduce cross-link interference between backhaul and access links allowing higher densification.

During the study item phase of the IAB work (summary of the study item can be found in the technical report (TR) 38.874), it was considered to adopt a solution that leverages the Central Unit (CU)/Distributed Unit (DU) split architecture of NR, where the IAB node will be hosting a DU part that is controlled by a central unit. The IAB nodes also have a Mobile Termination (MT) part that they use to communicate with their parent nodes.

The specifications for IAB may strive to reuse existing functions and interfaces defined in NR. In particular, MT, gNB-DU, gNB-CU, user plane function (UPF), Access and Mobility Function (AMF) and Session Management Function (SMF), as well as, the corresponding interfaces NR Uu (between MT and gNB), F1, NG, X2 and N4 are used as a baseline for the IAB architectures. Modifications or enhancements to these functions and interfaces for the support of IAB will be explained in the context of the architecture discussion. Additional functionality such as multi-hop forwarding is included in the architecture discussion as it may be used for the understanding of IAB operation and since certain aspects may be standardized.

The Mobile-Termination (MT) function may be considered as a component of the IAB node. In the context of this disclosure, MT is referred to as a function residing on an IAB-node that terminates the radio interface layers of the backhaul Uu interface toward the IAB-donor or other IAB-nodes.

FIGS. 1-3 provide example reference diagrams for IAB in standalone mode (SA), which includes one IAB-donor and multiple IAB-nodes. The IAB-donor may be treated as a single logical node that includes a set of functions such as gNB-DU, gNB-CU-CP, gNB-CU-UP and potentially other functions. In a deployment, the IAB-donor can be split according to these functions, which can all be either collocated or non-collocated as allowed by 3GPP Next Generation Radio Access Network (NG-RAN) architecture. IAB-related aspects may arise when such split is exercised. Also, some of the functions presently associated with the IAB-donor may eventually be moved outside of the donor in case it becomes evident that they do not perform IAB-specific tasks. FIG. 1 shows a high-level architectural view of an example IAB network. Examples of baseline user plane (UP) and control plane (CP) protocol stacks for IAB are shown in FIGS. 2 and 3. FIG. 2 is an example baseline UP protocol stack for IAB in Rel-16. FIG. 3 is an example baseline CP protocol stack for IAB in Rel-16.

As can be seen from FIGS. 1-3, the chosen protocol stacks reuse the current CU-DU split specification in 3GPP Release 15 (Rel-15), where the full user plane F1-U (GTP-U/UDP/IP) is terminated at the IAB node (like a normal DU) and the full control plane F1-C (F1-AP/SCTP/IP) is also terminated at the IAB node (like a normal DU). In the above cases, Network Domain Security (NDS) has been employed to protect both UP and CP traffic (Internet Protocol Security (IPsec) in the case of UP, and Datagram Transport Layer Security (DTLS) in the case of CP). IPsec may also be used for the CP protection instead of DTLS (in this case no DTLS layer would be used).

Backhaul Adaptation Protocol (BAP)

A new protocol layer called Backhaul Adaptation Protocol (BAP) has been introduced in the IAB nodes and the IAB-donor, which is used for routing of packets to the appropriate downstream/upstream node and also mapping the user equipment (UE)/wireless device (WD) bearer data to the proper backhaul radio link control (RLC) channel (and also between ingress and egress backhaul RLC channels in intermediate IAB nodes) to satisfy the end to end Quality of Service (QoS) requirements of bearers.

The UE establishes RLC channels to the DU on the UE's access IAB-node in compliance with 3GPP Technical Specification (TS) 38.300. Each of these RLC-channels is extended via F1-U between the UE's access DU and the IAB-donor. The information embedded in F1-U may be carried over backhaul RLC-channels across the backhaul links. Transport of F1-U over the wireless backhaul may be performed by the BAP. Since BAP is a newly defined layer for IAB networks, hence, 3GPP has made only the following considerations related to the BAP layer functionality:

RAN2 (e.g., Radio Layer 2 and Radio Layer 3 Radio Resource) confirms that routing and bearer mapping (e.g., mapping of BH RLC channels) are BAP layer functions.

RAN2 assumes that the transmit (TX) part of the BAP layer performs routing and "bearer mapping", and the receive (RX) part of the BAP layer performs "bearer de-mapping".

RAN2 assumes that service data units (SDUs) are forwarded from the RX part of the BAP layer to the TX part of the BAP layer (for the next hop) for packets that are relayed by the IAB node.

For both UL and DL, the BAP header for Data protocol data unit (PDU) has a length of 3B, which hold 1 D/C bit, 3 R bits, 10 bits for the BAP address, and 10 bits for BAP path identification (ID) (this may override earlier considerations).

For BAP routing Next Hop ID, The BAP address of the next hop node to be used as the next hop identifier for the downstream.

For BAP routing Next Hop ID, the BAP address of the next hop node is also to be used as the next hop identifier for the upstream.

Confirm that the BAP address for an IAB node (e.g., to differentiate the data delivered to higher layer in BAP) is configured via Radio Resource Control (RRC).

To configure the association between child IAB-node and Next Hop ID, RAN2 may assume that the CU includes the BAP address of the child IAB-node in a F1AP configuration (e.g., F1AP UE CONTEXT SETUP/MODIFICATION REQUEST message) for the child IAB-node MT. Details may be determined by R3.

To configure the association between parent IAB-node and Next Hop ID (i.e., BAP address of next hop), the CU includes the BAP address of the parent IAB-node together with the cell group identification (ID) of the parent node in the RRC Reconfiguration message (details for further study (FFS)).

Observation: Upstream and downstream bearer mapping tables can use either the backhaul (BH) RLC channel (CH) ID or the Logical Channel ID (LCID) (they are mapped 1-to-1) for BAP ingress and egress RLC channel IDs.

The BH RLC CH ID is used for ingress/egress RLC channel ID in the BAP bearer mapping configuration.

Backhaul-Link-Failure

Backhaul Link Failure Recovery Scenarios

For various reasons, different scenarios of backhaul-link failure may occur in IAB networks. In the following, some example scenarios are illustrated for backhaul-link failure. Each scenario is depicted with an illustrative figure (FIGS. 4 to 6) aiming at establishing a route between IAB-donor and IAB-node D after BH-link failure, where:

Nodes A1 and A2 are IAB-donor nodes; nodes B to H are IAB-nodes;

The dashed line represents the established connection between two nodes;

The arrow represents the established route after BH-link failure, and the bolded dashed line represents the new established connection.

Scenario 1

In this scenario (depicted in FIG. 4), the backhaul-link failure occurs between on upstream IAB-node (e.g., IAB-node C) and one of its parent IAB-nodes (e.g., IAB-node B), where the upstream IAB-node (IAB-node C) has an additional link established to another parent node (IAB-node E).

Scenario 2

In this scenario (depicted in FIG. 5), the backhaul-link failure occurs between an upstream IAB-node (e.g., IAB-node C) and all its parent IAB-nodes (e.g., IAB-nodes B and E). The upstream IAB-node (IAB-node C) has to reconnect to a new parent node (e.g., IAB-node F), and the connection between IAB-node F and IAB-node C is newly established).

Scenario 3

In this scenario (depicted in FIG. 6), the backhaul-link failure occurs between IAB-node C and IAB-node D. IAB-node D has to reconnect to the new IAB-donor (e.g., IAB-donor A2) via a new route.

So far 3GPP has considered the followed related to radio link failure (RLF), which may be performed by one or more network nodes and/or a UE:

R2 (e.g., Radio Layer 2) confirms that when the IAB-node is not configured with dual connectivity (DC), R2 applies for BH RLF handling the same mechanisms and procedures as UE's RLF handling currently specified in TS 38.331 (including e.g., detection and recovery). FFS on additional enhancements.

When NR DC is configured for the IAB-node, 2.1 RLF is detected separately for the master cell group (MCG)-link and for the secondary cell group (SCG)-link, and 2.2 existing UE procedures are used for MCG-link and SCG-link failure handling.

The following may be considered as a working assumption: BH RLF recovery for DC case reuses UE's MCG and SCG failure recovery procedures specified in Rel-16.

For an IAB-node not configured with DC, R2 initiates RRC reestablishment when it receives downstream notification "Recovery Failure".

For DC case, the IAB-node considers the radio link is failed and uses RRC existing or Rel-16 Mechanism (e.g., MCG or SCG failure report, RRC reestablishment) if "Recovery Failure" notification is received from parent nodes on MCG-link or/and SCG-link.

R2 assumes that RLF notification "recovery failure" would be triggered when RRC reestablishment has failed. FFS whether this need to be specified.

BAP layer is used to transmit BH RLF notification(s).

R2 assumes that Upstream BH RLF notification to Donor CU via current F1-AP signalling is supported.

To summarize/clarify the impact of these considerations, when RLF occurs at the IAB BH link, the same mechanisms and procedures are applied as for the access link. This includes BH RLF detection and RLF recovery using RRC reestablishment procedure.

For IAB-nodes operating in SA-mode, the IAB-node may transmit an RLF notification message to its child nodes in case the RRC reestablishment procedure to recover the BH link fails. The child node considers the BH link, on which it has received the RLF notification as failed (i.e., as if it has detected RLF on that BH link). The RLF notification message is transmitted on BAP layer.

Backhaul Link RLF Notification Types to Downstream/Descendant Nodes

3GPP RAN2 considered the following possible notification types to downstream node(s):

Type 1—"Plain" notification: Indication that BH link RLF is detected by the child IAB-node.

Type 2—"Trying to recover": Indication that BH link RLF is detected, and the child IAB-node is attempting to recover from it.

Type 3—"BH link recovered": Indication that the BH link successfully recovers from RLF.

Type 4—"Recovery failure": Indication that the BH link RLF recovery failure occurs.

Type 4x—"Indicating child nodes to perform RLF procedure": it may be implementation when the parent node sending this indication, and the child node should perform RLF related procedure when receiving this indication.

SUMMARY

Some embodiments advantageously provide methods, systems, and apparatuses for preventing reestablishment at descendant nodes with no alternative paths in Integrated Access Backhaul (IAB) networks.

According to an aspect of the present disclosure, a method implemented in a network node configured to communicate with at least one descendant node over a backhaul network is provided. The method comprises transmitting an indication to the at least one descendant network node, the indication associated with a radio link failure; and receiving at least one message in response to the indication. The at least one message is associated with an alternative path availability of the at least one descendant network node toward a third network node.

In some embodiments, the at least one message indicates at least one of: at least one path that is not available as an alternative path; and at least one path that is available as the alternative path. In some embodiments of this aspect, the at least one message comprises an alternative path availability flag indicating whether the at least one descendant network node has an alternative path toward the third network node. In some embodiments of this aspect, the at least one message comprises an indication of at least one cell that a distributed unit, DU, in the at least one descendant network node is hosting. In some embodiments of this aspect, the method further includes considering at least one first cell in the at least one cell as a candidate for re-establishment. In some embodiments of this aspect, considering the at least one first cell as the candidate for re-establishment when the at least one first cell comprises a strongest cell, the strongest cell having a strongest signal level as compared to any other cells the network node measures.

In some embodiments of this aspect, considering the at least one first cell as the candidate for re-establishment when the at least one first cell comprises a strongest cell, the strongest cell having a strongest signal level among cells in the at least one cell indicated in the at least one message. In some embodiments of this aspect, the method further includes considering none of the cells in the at least one cell as a candidate for re-establishment. In some embodiments of this aspect, the at least one cell indicated in the at least one message comprises a first set of cells and a second set of cells; and the method further comprises: considering none of the first set of cells as a candidate for re-establishment; and considering the second set of cells in the at least one cell as the candidate for re-establishment.

In some embodiments of this aspect, the at least one message comprises a dedicated preamble; and the method further comprises using the dedicated preamble to attempt a random access, RA, for a radio resource control, RRC, re-establishment procedure via the at least one descendant network node. In some embodiments of this aspect, the network node is a parent Integrated Access Backhaul, IAB, node and the third network node is a donor IAB node. In some embodiments of this aspect, the method further includes receiving a dual-connectivity indication when the at least one descendent network node is connected via dual-connectivity.

According to another aspect of the present disclosure, a method implemented in a first network node that is configured to communicate with a second network node over a backhaul network is provided. The method includes receiving, from the second network node, an indication associated with a radio link failure; and transmitting at least one message to the second network node in response to the indication, the at least one message associated with an alternative path availability of the first network node toward a third network node.

In some embodiments, the at least one message indicates at least one of: at least one path that is not available as an alternative path; and at least one path that is available as the alternative path. In some embodiments of this aspect, the method further includes determining whether the first network node has an alternative path toward a third network node, the at least one message being based at least in part on the determination. In some embodiments of this aspect, the at least one message comprises an alternative path availability flag indicating whether the first network node has an alternative path toward the third network node. In some embodiments of this aspect, the at least one message comprises an indication of at least one cell that a distributed unit, DU, in the first network node is hosting. In some embodiments of this aspect, the at least one cell indicated in the at least one message transmitted to the second network node comprises: at least one first cell to be considered by the second network node as a candidate for re-establishment.

In some embodiments of this aspect, the at least one first cell is to be considered as the candidate for re-establishment when the at least one first cell comprises a strongest cell, the strongest cell having a strongest signal level as compared to any other cells the second network node measures. In some embodiments of this aspect, the at least one first cell is to be considered as the candidate for re-establishment when the at least one first cell comprises a strongest cell, the strongest cell having a strongest signal level among cells in the at least one cell indicated in the at least one message. In some embodiments of this aspect, none of the cells in the at least one cell indicated in the at least one message is to be considered as a candidate for re-establishment.

In some embodiments of this aspect, the at least one cell indicated in the at least one message comprises a first set of cells and a second set of cells, none of the first set of cells are to be considered by the second network node as a candidate for re-establishment and the second set of cells are to be considered by the second network node as the candidate for re-establishment. In some embodiments of this aspect, the at least one message comprises a dedicated preamble for the second network node to perform a random access, RA, for a radio resource control, RRC, re-establishment procedure via the first network node. In some embodiments of this aspect, the second network node is a parent Integrated Access Backhaul, IAB, node and the third network node is a donor IAB node.

According to yet another aspect of the present disclosure, a network node configured to communicate with at least one descendant node over a backhaul network is provided. The network node comprises processing circuitry. The processing circuitry is configured to cause the network node to transmit an indication to the at least one descendant network node, the indication associated with a radio link failure; and receive at least one message in response to the indication, the at least one message associated with an alternative path availability of the at least one descendant network node toward a third network node.

In some embodiments, the at least one message indicates at least one of: at least one path that is not available as an alternative path; and at least one path that is available as the alternative path. In some embodiments of this aspect, the at least one message comprises an alternative path availability flag indicating whether the at least one descendant network node has an alternative path toward the third network node. In some embodiments of this aspect, the at least one message comprises an indication of at least one cell that a distributed unit, DU, in the at least one descendant network node is hosting. In some embodiments of this aspect, the processing circuitry is configured to cause the network node to consider at least one first cell in the at least one cell as a candidate for re-establishment.

In some embodiments of this aspect, the processing circuitry is configured to cause the network node to consider the at least one first cell as the candidate for re-establishment when the at least one first cell comprises a strongest cell, the strongest cell having a strongest signal level as compared to any other cells the network node measures. In some embodiments of this aspect, the processing circuitry is configured to cause the network node to consider the at least one first cell as the candidate for re-establishment when the at least one first cell comprises a strongest cell, the strongest cell having a strongest signal level among cells in the at least one cell indicated in the at least one message.

In some embodiments of this aspect, the processing circuitry is further configured to cause the network node to consider none of the cells in the at least one cell as a candidate for re-establishment. In some embodiments of this aspect, the at least one cell indicated in the at least one message comprises a first set of cells and a second set of cells; and the processing circuitry is configured to cause the network node to: consider none of the first set of cells as a candidate for re-establishment; and consider the second set of cells in the at least one cell as the candidate for re-establishment.

In some embodiments of this aspect, the at least one message comprises a dedicated preamble; and the processing circuitry is configured to cause the network node to use the dedicated preamble to attempt a random access, RA, for a radio resource control, RRC, re-establishment procedure via the at least one descendant network node. In some embodiments of this aspect, the network node is a parent Integrated Access Backhaul, IAB, node and the third network node is a donor IAB node. In some embodiments of this aspect, the processing circuitry is configured to cause the network node to receive a dual-connectivity indication when the at least one descendant network node is connected via dual-connectivity.

According to another aspect of the present disclosure, a first network node that is configured to communicate with a second network node over a backhaul network is provided. The first network node comprises processing circuitry. The processing circuitry is configured to cause the first network node to: receive, from the second network node, an indication associated with a radio link failure; and transmit at least one message to the second network node in response to the indication, the at least one message associated with an alternative path availability of the first network node toward a third network node.

In some embodiments, the at least one message indicates at least one of: at least one path that is not available as an alternative path; and at least one path that is available as the alternative path. In some embodiments of this aspect, the processing circuitry is further configured to cause the first network node to: determine whether the first network node has an alternative path toward a third network node, the at least one message being based at least in part on the determination. In some embodiments of this aspect, the at least one message comprises an alternative path availability flag indicating whether the first network node has an alternative path toward the third network node. In some embodiments of this aspect, the at least one message comprises an indication of at least one cell that a distributed unit, DU, in the first network node is hosting. In some embodiments of this aspect, the at least cell indicated in the at least one message transmitted to the second network node comprises: at least one first cell to be considered by the second network node as a candidate for re-establishment.

In some embodiments of this aspect, the at least one first cell is to be considered as the candidate for re-establishment when the at least one first cell comprises a strongest cell, the strongest cell having a strongest signal level as compared to any other cells the second network node measures. In some embodiments of this aspect, the at least one first cell is to be considered as the candidate for re-establishment when the at least one first cell comprises a strongest cell, the strongest cell having a strongest signal level among cells in the at least one cell indicated in the at least one message. In some embodiments of this aspect, none of the cells in the at least one cell indicated in the at least one message is to be considered as a candidate for re-establishment.

In some embodiments of this aspect, the at least one cell indicated in the at least one message comprises a first set of cells and a second set of cell, none of the first set of cells are to be considered by the second network node as a candidate for re-establishment and the second set of cells are to be considered by the second network node as the candidate for re-establishment. In some embodiments of this aspect, the at least one message comprises a dedicated preamble for the second network node to perform a random access, RA, for a radio resource control, RRC, re-establishment procedure via the first network node. In some embodiments of this aspect, the second network node is a parent Integrated Access Backhaul, IAB, node and the third network node is a donor IAB node.

According to another aspect of the present disclosure, a method implemented in a first network node configured to communicate with at least one descendant network node over a backhaul network is provided. The method comprises transmitting a first message type to the at least one descendant network node, the first message type indicating a backhaul link radio link failure and the first message type triggering at the at least one descendant network node at least one of: a reduction of scheduling resource requests; stopping scheduling resource requests; and using an alternative route to a donor Integrated Access Backhaul, IAB, network node. In some embodiments of this aspect, the method further includes transmitting a second message type to the at least one descendant network node, the second message type indicating the backhaul link is recovered and the second message type triggering resumption of the scheduling resource requests. In some embodiments of this aspect, the scheduling resource requests comprise at least one of a scheduling request, SR, and a buffer status report, BSR.

According to yet another aspect of the present disclosure, a method implemented in a first network node configured to communicate with a second network node over a backhaul network is provided. The method comprises receiving a first message type from the second network node, the first message type indicating a backhaul link radio link failure and the first message type triggering at least one of: a reduction of scheduling resource requests to the second network node; stopping scheduling resource requests to the second network node; and using an alternative route to a donor Integrated Access Backhaul, IAB, network node.

In some embodiments of this aspect, the method further includes receiving a second message type from the second network node, the second message type indicating the backhaul link is recovered and the second message type triggering resumption of the scheduling resource requests. In some embodiments of this aspect, the scheduling resource requests comprise at least one of a scheduling request, SR, and a buffer status report, BSR.

According to another aspect, a first network node configured to communicate with at least one descendant network node over a backhaul network is provided. The first network node comprises processing circuitry. The processing circuitry is configured to cause the first network node to: transmit a first message type to the at least one descendant network node, the first message type indicating a backhaul link radio link failure and the first message type triggering at the at least one descendant network node at least one of: a reduction of scheduling resource requests; stopping scheduling resource requests; and using an alternative route to a donor Integrated Access Backhaul, IAB, network node.

In some embodiments of this aspect, the processing circuitry is further configured to cause the first network node to: transmit a second message type to the at least one descendant network node, the second message type indicating the backhaul link is recovered and the second message type triggering resumption of the scheduling resource requests. In some embodiments of this aspect, the scheduling resource requests comprise at least one of a scheduling request, SR, and a buffer status report, BSR.

According to another aspect, a first network node configured to communicate with a second network node over a backhaul network is provided. The first network node comprises processing circuitry. The processing circuitry is configured to cause the first network node to: receive a first message type from the second network node, the first message type indicating a backhaul link radio link failure and the first message type triggering at least one of: a reduction of scheduling resource requests to the second network node; stopping scheduling resource requests to the second network node; and using an alternative route to a donor Integrated Access Backhaul, IAB, network node.

In some embodiments of this aspect, the processing circuitry is further configured to cause the first network node to: receive a second message type from the second network node, the second message type indicating the backhaul link is recovered and the second message type triggering resumption of the scheduling resource requests. In some embodiments of this aspect, the scheduling resource requests comprise at least one of a scheduling request, SR, and a buffer status report, BSR.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 11 is a flowchart illustrating exemplary methods implemented in a communication system including a host computer, a network node and a user equipment for receiving user data from the user equipment at a host computer according to some embodiments of the present disclosure;

FIG. 12 is a flowchart illustrating exemplary methods implemented in a communication system including a host computer, a network node and a user equipment for receiving user data at a host computer according to some embodiments of the present disclosure;

FIG. 15 is a flowchart of an exemplary process in a network node (e.g., a parent IAB node) according to some embodiments of the present disclosure;

FIG. 16 is a flowchart of an exemplary process in a network node (e.g., a descendant IAB node) according to some embodiments of the present disclosure;

DETAILED DESCRIPTION

Figure 1:
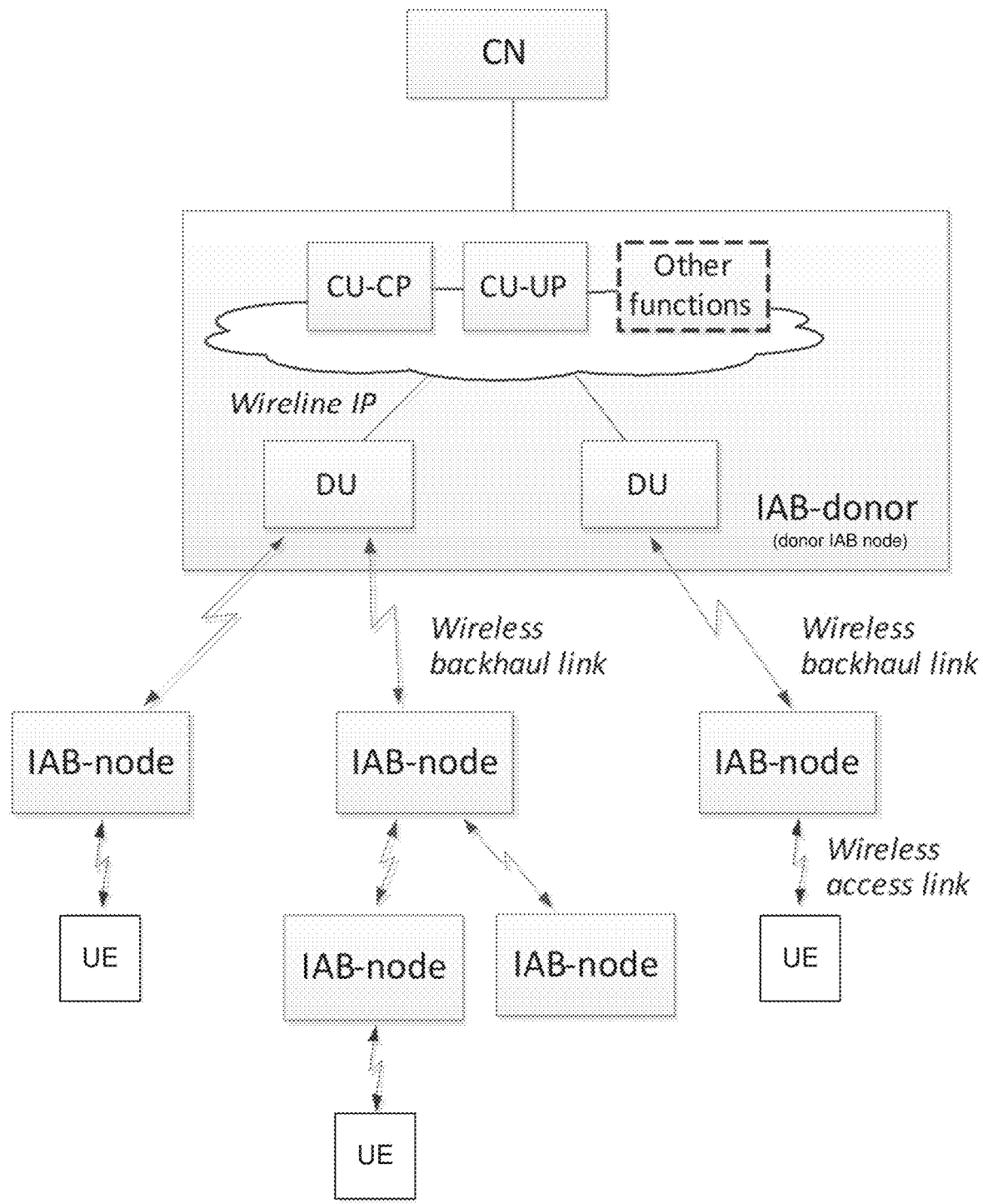
FIG. 1 illustrates an example reference diagram for IAB-architectures (TR 38.874 v0.7.0)
Figure 2:
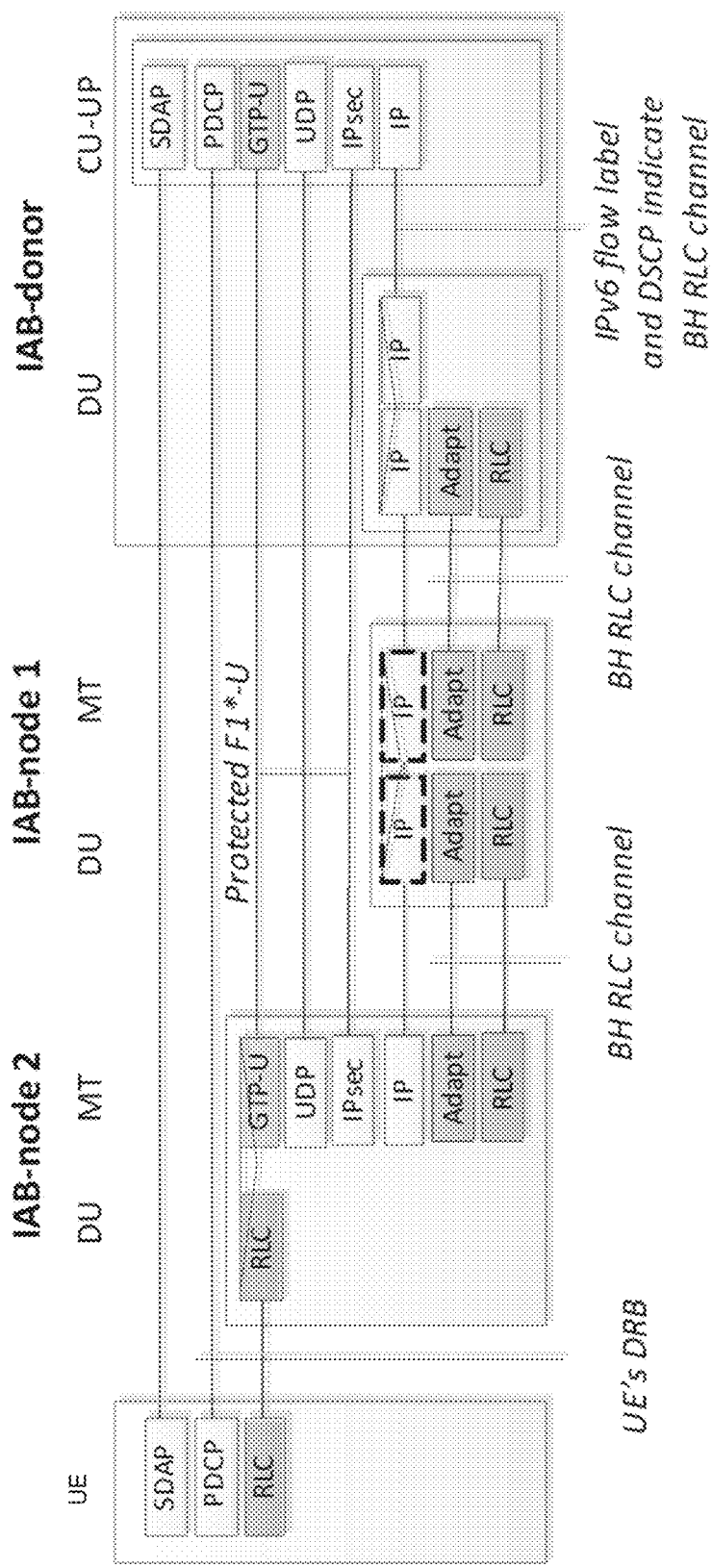
FIG. 2 illustrates an example of Baseline User Plane (UP) Protocol stack for IAB in rel-16
Figure 3:
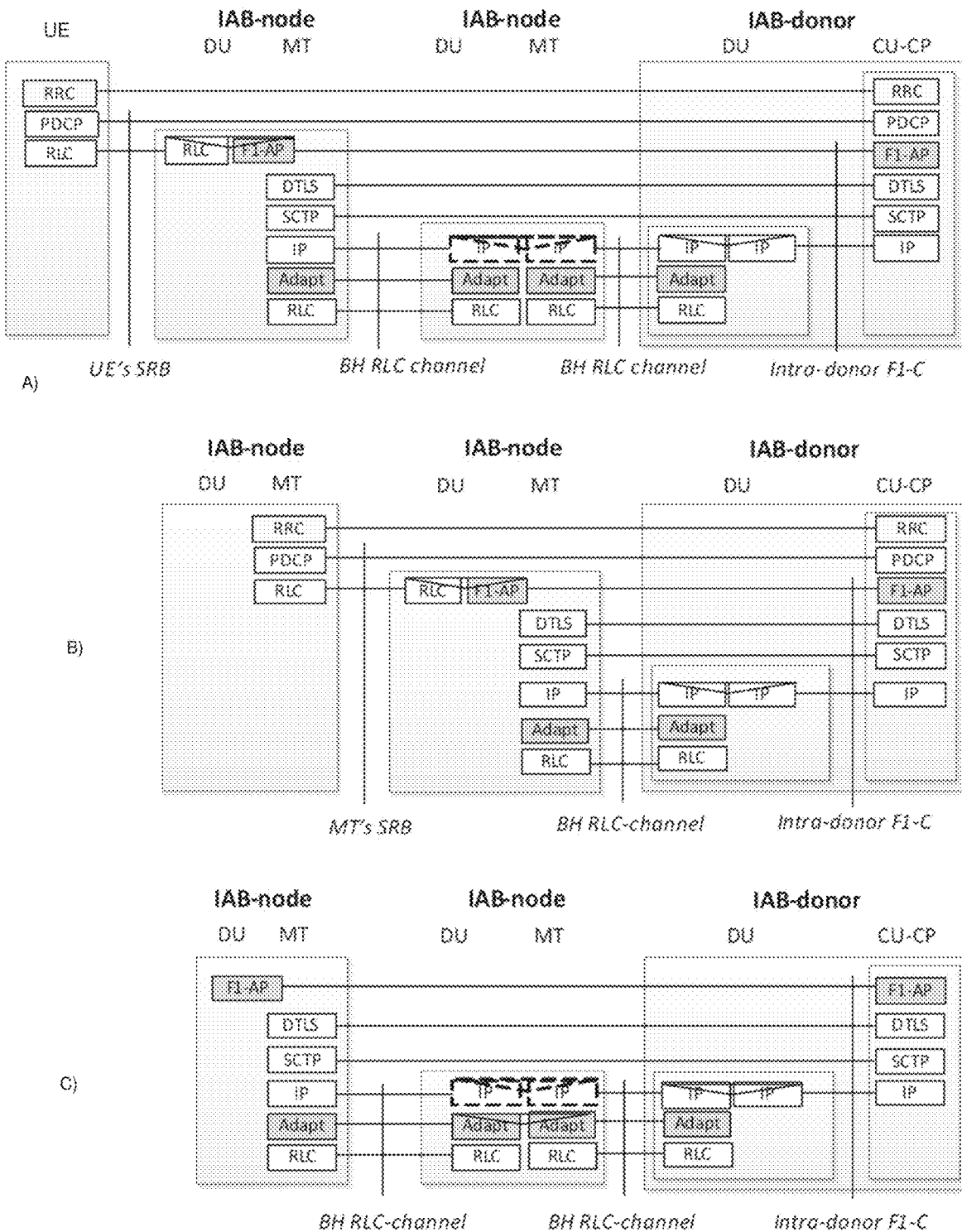
FIG. 3 illustrates an example Baseline control plane (CP) Protocol stack for IAB in rel-16.
Figure 4:
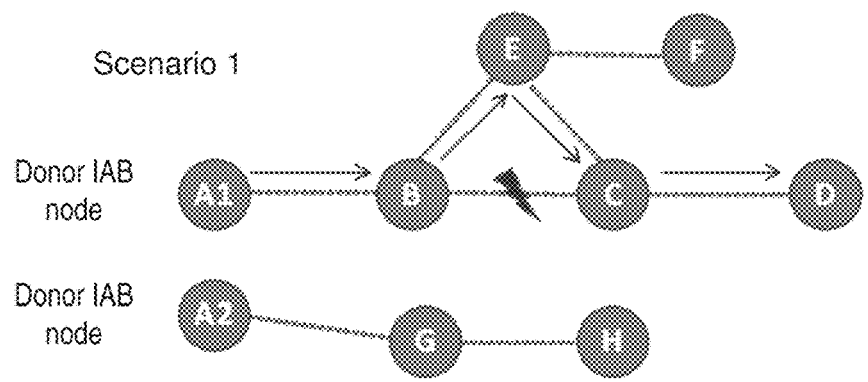
FIG. 4 illustrates an example of backhaul-link failure scenario 1.
Figure 5:
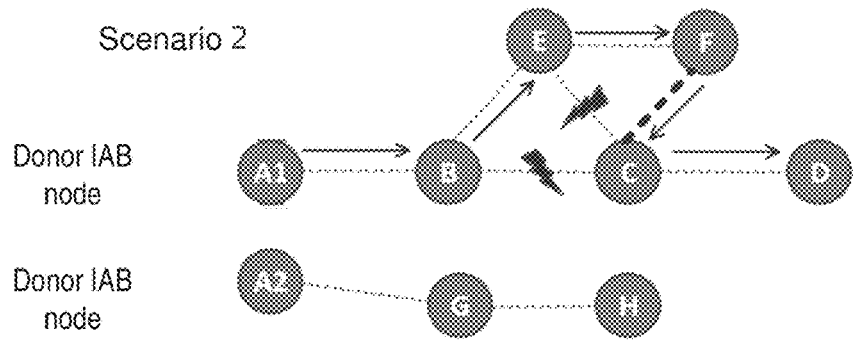
FIG. 5 illustrates an example backhaul-link failure scenario 2.
Figure 6:
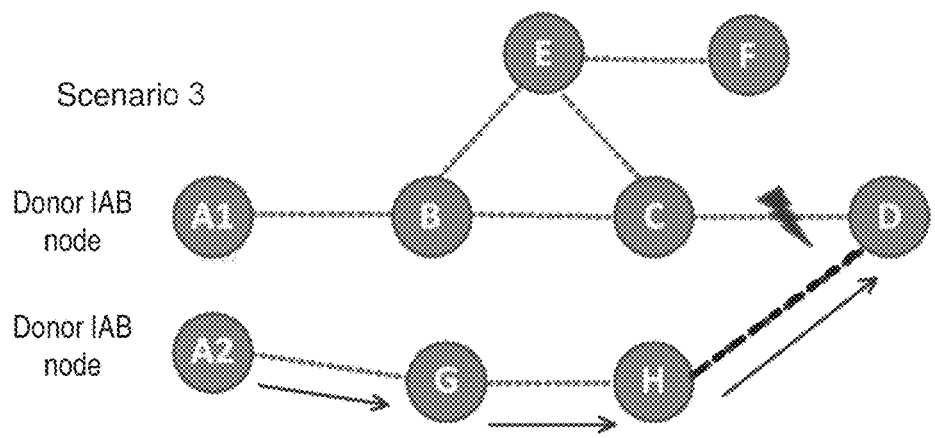
FIG. 6 illustrates an example backhaul-link failure scenario 3.

With regard to the Type 1-4 messages described above, RAN2 assumes that an IAB node would trigger Type 4 notification, which is an indication from a parent IAB node to child IAB node(s) about RRC re-establishment failure and losing connection with the Donor CU. Thus, this notification message aims at triggering an RRC re-establishment in the child node(s) receiving the message. The other notification types are under discussion in RAN2. It has been considered that Type 2 and Type 3 could be beneficial for the overall network performance. For example, before Type 4 notification is received by child node(s), the child node(s) is likely to transmit a scheduling request (SR) request to its parent node as well as receiving and buffering data from its child node(s) and other UEs. This might lead to buffer overflows in the network. Any lost data due to the buffer overflow may have to be recovered via higher layers e.g., transmission control protocol (TCP) or application.

To prevent child nodes from transmitting uplink (UL) data and even request network resources via buffer status report (BSR) or SR, Type 2 and Type 3 could be useful. In some embodiments, when Type 2 is received by a child IAB node, the child IAB node may reduce or stop requesting scheduling resources. In some embodiments, Type 2 may also trigger the child IAB node to use alternative routes, when available. When the situation is solved, Type 3 indication may allow resuming the request of scheduling resources.

If an IAB node that has detected BH RLF tries to perform re-establishment attempts towards a cell that is hosted by one of its child nodes, and if the child node has no other alternative path/parent, the re-establishment request may never reach the donor CU (as the child IAB node may try to forward this message via the parent node that already has lost BH connectivity). So far RAN2 has considered to send only Type 4 BH RLF notification, which is an indication from a parent IAB node to child IAB node(s) about the failure to recover the BH connection. Though this BH RLF notification is useful in that it will trigger the child node to re-establish to another parent, it will not help in ensuring the parent node recovers from the BH RLF that has experienced.

Additional BH RLF related notification message such as Type 2 message (indicating that parent node has detected BH RLF and is trying to recover the connection) may be used as a guidance to the descendant nodes that they may consider that the upstream node is not operational, at least temporarily. Still, these additional notification messages may not help the parent node to recover from the BH RLF, because it could still end up trying to reestablishing to one of the child nodes that it has sent the Type 2 BH RLF notification messages (as the IAB-MT of the parent node is not aware of the identity of the cells that are hosted by those of the child node's IAB-DU, and also whether the child node has alternative paths to the donor or not).

Accordingly, some embodiments of the present disclosure may prevent the IAB node experiencing BH RLF to avoid re-establishment at its descendant node unless the descendant node has an alternative path/parent towards the donor DU/CU. For this purpose, some embodiments provide a procedure where a descendant node will respond to a Type 2 BH RLF indication (i.e., parent node has detected BH RLF and is trying to recover the link) received from its parent node by sending information about the cells that it (i.e., its DU) is hosting and whether the child node has an alternate path to the donor node. The parent node may then use this information to determine whether or not to perform RRC re-establishment via one of the cells indicated in the response message.

Some embodiments of the present disclosure may advantageously ensure that a parent IAB node will not perform RRC re-establishment attempts at its own descendant nodes unless the descendant nodes have an alternative path towards the IAB Donor node. This may prevent a deadlock situation where the parent node is trying to recover the connection through the child node, which is waiting for the parent node to recover the connection.

Before describing in detail exemplary embodiments, it is noted that the embodiments reside primarily in combinations of apparatus components and processing steps related to arrangements for preventing reestablishment at descendant nodes with no alternative paths in Integrated Access Backhaul (IAB) networks. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of an integrated access and backhaul (IAB) donor node, a parent IAB node, a descendent IAB node, a base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a user equipment (UE) or a radio network node.

In some embodiments, the non-limiting terms wireless device (WD) or a user equipment (UE) are used interchangeably. The UE herein can be any type of wireless device capable of communicating with a network node or another UE over radio signals, such as wireless device (WD). The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

The term "node" is used herein and may indicate an IAB node. In some embodiments, the terms "child" and "descendent" are used interchangeably. The shortened terms "parent", "child" and "donor" may be used to indicate a parent IAB node, a child IAB node and an IAB donor node, respectively.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a user equipment or a network node may be distributed over a plurality of user equipments and/or network nodes. In other words, it is contemplated that the functions of the network node and user equipment described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements for preventing reestablishment at descendant nodes with no alternative paths in Integrated Access Backhaul (IAB) networks.

Figure 7:
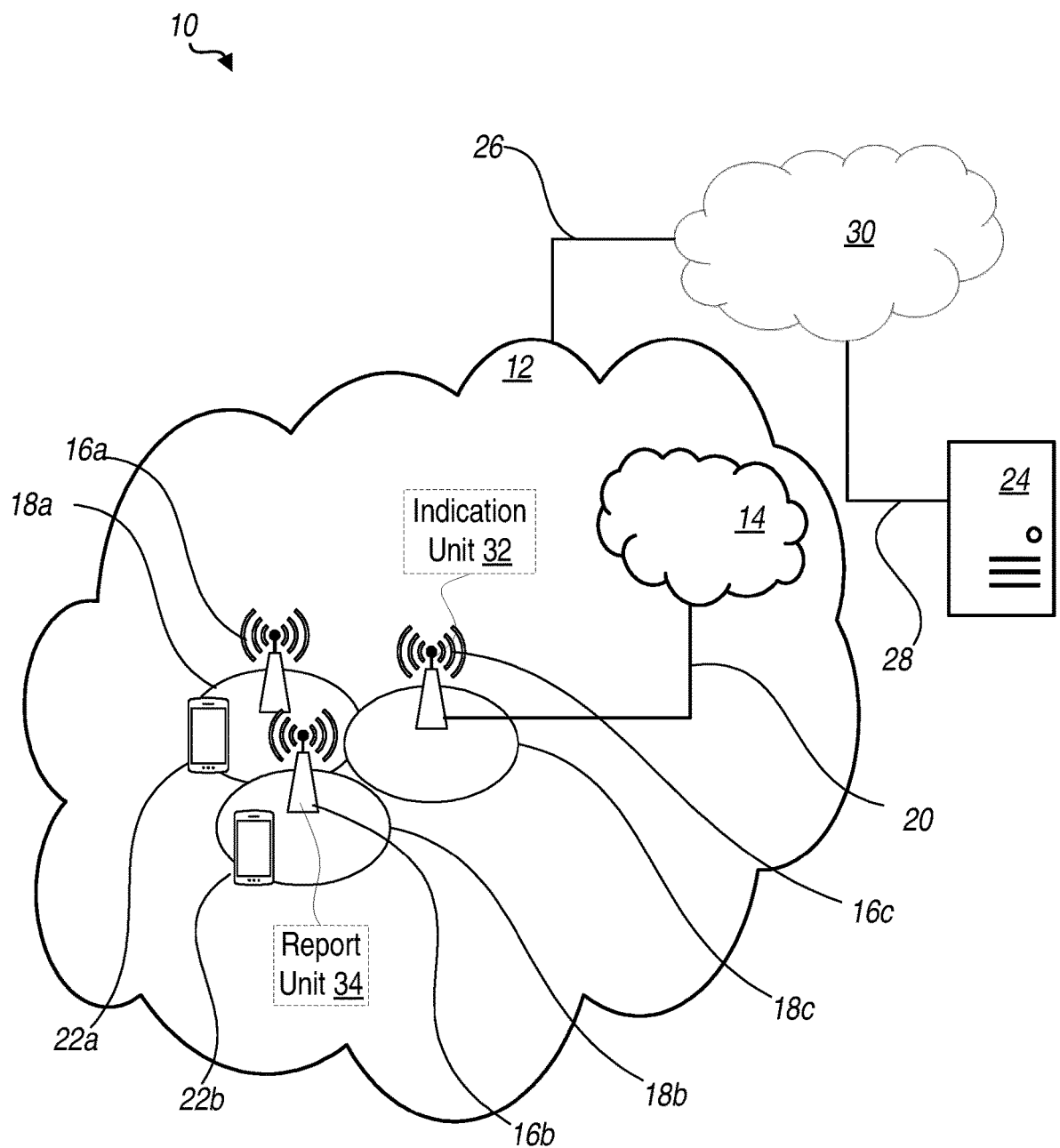
FIG. 7 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 7 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. Network nodes 16 may be in communication with each other via one or more backhaul links and/or backhaul network. A first user equipment (UE) 22a located in coverage area 18a is configured to wirelessly connect to, or be paged by, the corresponding network node 16a. A second UE 22b in coverage area 18b is wirelessly connectable to the corresponding network node 16b. While a plurality of UEs 22a, 22b (collectively referred to as user equipments 22) are illustrated in this example, the disclosed embodiments are equally applicable to a situation where a sole UE is in the coverage area or where a sole UE is connecting to the corresponding network node 16. Note that although only two UEs 22 and three network nodes 16 are shown for convenience, the communication system may include many more UEs 22 and network nodes 16.

Also, it is contemplated that a UE 22 can be in simultaneous communication and/or configured to separately communicate with more than one network node 16 and more than one type of network node 16. For example, a UE 22 can have dual connectivity with a network node 16 that supports LTE and the same or a different network node 16 that supports NR. As an example, UE 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 7 as a whole enables connectivity between one of the connected UEs 22a, 22b and the host computer 24. The connectivity may be described as an over-the-top (OTT) connection. The host computer 24 and the connected UEs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over)

to a connected UE 22*a*. Similarly, the network node 16 need not be aware of the future routing of an outgoing uplink communication originating from the UE 22*a* towards the host computer 24.

A network node 16 (e.g., parent IAB node) configured to communicate with at least one descendant node over a backhaul network is configured to include an indication unit 32 which is configured to one or more of: transmit an indication to the at least one descendant network node, the indication associated with a radio link failure; receive at least one message in response to the indication, the at least one message associated with an alternative path availability of the at least one descendant network node toward a third node; and optionally, receive a dual-connectivity indication when the at least one descendent network node is connected via dual-connectivity.

A network node 16 (e.g., child/descendent IAB node) configured to communicate with a second node over a backhaul network is configured to include a report unit 34 which is configured to one or more of: receive, from the second node, an indication associated with a radio link failure; determine whether the first network node has an alternate path toward a third node; transmit at least one message to the second node in response to the indication, the at least one message based at least in part on the determination; and optionally, transmit a dual-connectivity indication to the second node when the first network node is connected via dual-connectivity.

Example implementations, in accordance with an embodiment, of the UE 22, network node 16 and host computer 24 discussed in the preceding paragraphs will now be described with reference to FIG. 8. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a UE 22 connecting via an OTT connection 52 terminating at the UE 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the user equipment 22. The processing circuitry 42 of the host computer 24 may include a monitor unit 54 configured to enable the service provider to observe, monitor, control, transmit to and/or receive from the network node 16 and/or the user equipment 22.

The communication system 10 further includes a network node 16 provided in a communication system 10 and including hardware 58 enabling it to communicate with the host computer 24 and with the UE 22. The hardware 58 may include a communication interface 60 for setting up and maintaining a wired or wireless connection with an interface of a different communication device of the communication system 10, as well as a radio interface 62 for setting up and maintaining at least a wireless connection 64 with a UE 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include indication unit 32 and/or report unit 34 configured to perform network node methods discussed herein, such as the methods discussed with reference to FIGS. 13 and 14, as well as other figures.

The communication system 10 further includes the UE 22 already referred to. The UE 22 may have hardware 80 that may include a radio interface 82 configured to set up and maintain a wireless connection 64 with a network node 16 serving a coverage area 18 in which the UE 22 is currently located. The radio interface 82 may be formed as or may include, for example, one or more RF transmitters, one or more RF receivers, and/or one or more RF transceivers.

The hardware 80 of the UE 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 90, which is stored in, for example, memory 88 at the UE 22, or stored in external memory (e.g., database, storage array, network storage device, etc.) accessible by the UE 22. The software 90 may be executable by the processing circuitry 84. The software 90 may include a client application 92. The client application 92 may be operable to provide a service to a human or non-human user via the UE 22, with the support of the host computer 24. In the host computer 24, an executing host application 50 may communicate with the executing client application 92 via the OTT connection 52 terminating at the UE 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by UE 22. The processor 86 corresponds to one or more processors 86 for performing UE 22 functions described herein. The UE 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to UE 22.

Figure 8:
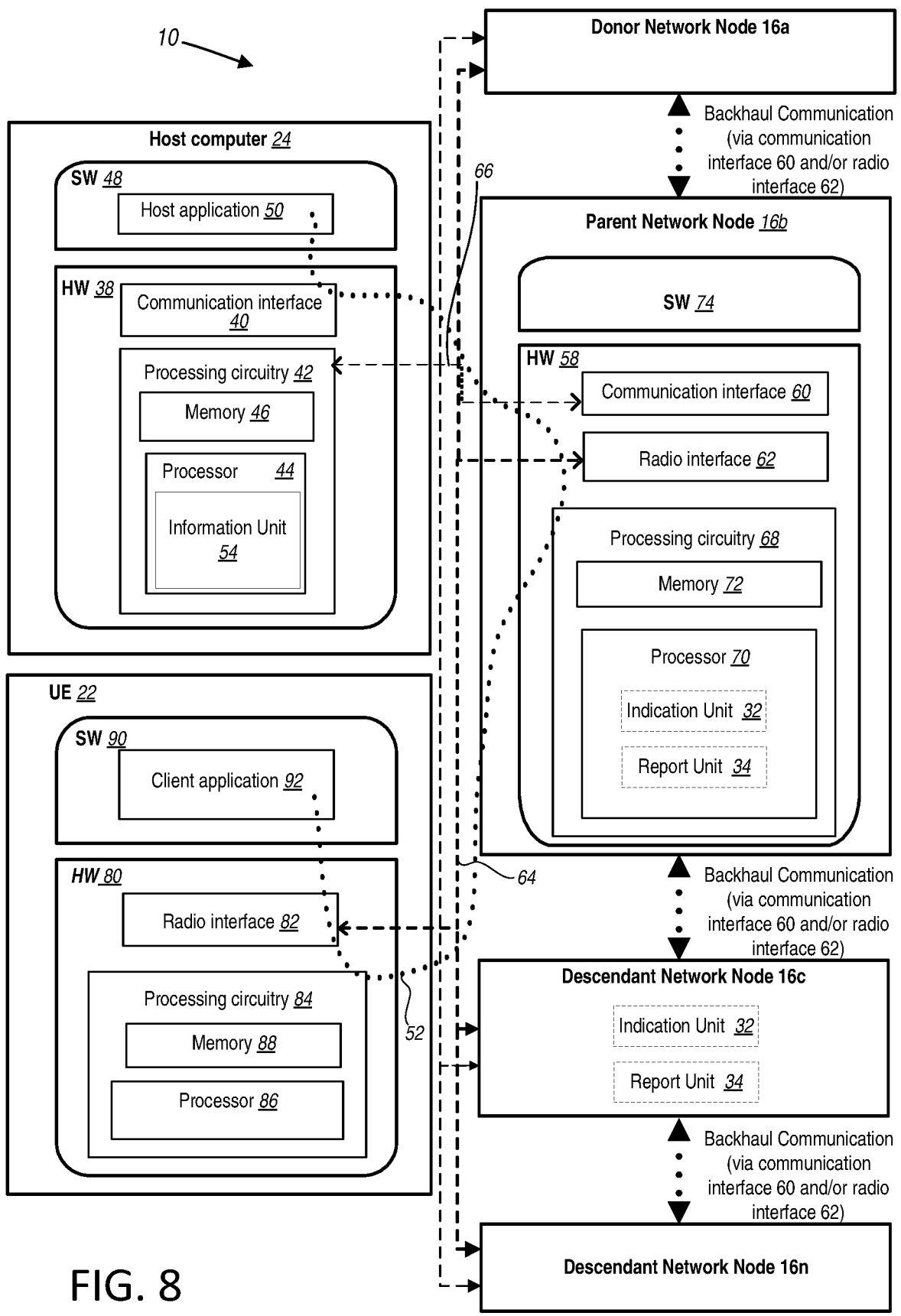
FIG. 8 is a block diagram of a host computer communicating via a network node with a user equipment over an at least partially wireless connection according to some embodiments of the present disclosure.

In some embodiments, the inner workings of the network node 16, UE 22, and host computer 24 may be as shown in FIG. 8 and independently, the surrounding network topology may be that of FIG. 7.

In FIG. 8, the OTT connection 52 has been drawn abstractly to illustrate the communication between the host computer 24 and the user equipment 22 via the network node 16, without explicit reference to any intermediary devices and the precise routing of messages via these devices. Network infrastructure may determine the routing, which it may be configured to hide from the UE 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the UE 22 and the network node 16 is in accordance with the teachings of the embodiments described throughout this disclosure. One or more of the various embodiments improve the performance of OTT services provided to the UE 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and UE 22, in response to variations in the measurement results. The measurement procedure and/or the network functionality for reconfiguring the OTT connection 52 may be implemented in the software 48 of the host computer 24 or in the software 90 of the UE 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary UE signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the UE 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the UE 22, and/or preparing/terminating/maintaining/supporting/ending in receipt of a transmission from the UE 22.

In some embodiments, the host computer 24 includes processing circuitry 42 and a communication interface 40 that is configured to a communication interface 40 configured to receive user data originating from a transmission from a UE 22 to a network node 16. In some embodiments, the UE 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 7 and 8 show various "units" such as indication unit 32, and report unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 9, 10:
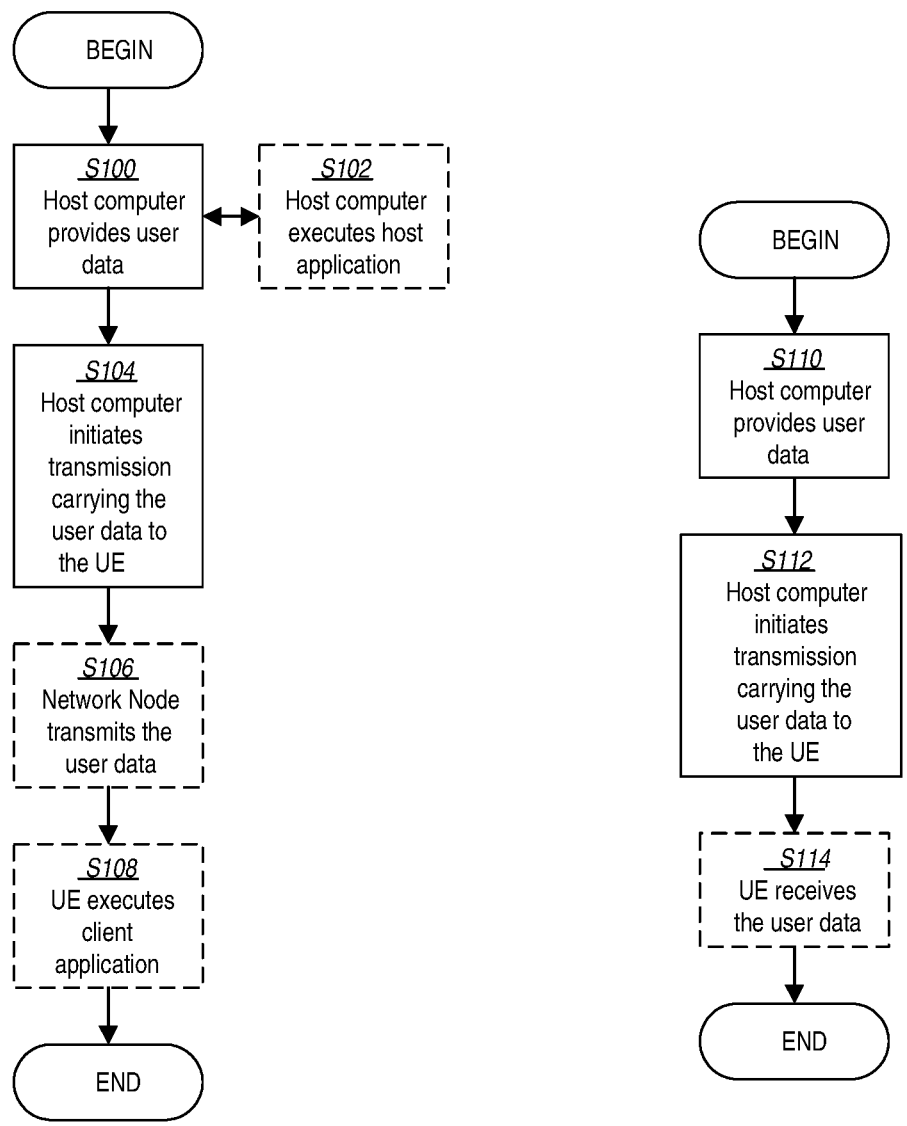
FIG. 9 is a flowchart illustrating exemplary methods implemented in a communication system including a host computer, a network node and a user equipment for executing a client application at a user equipment according to some embodiments of the present disclosure.
FIG. 10 is a flowchart illustrating exemplary methods implemented in a communication system including a host computer, a network node and a user equipment for receiving user data at a user equipment according to some embodiments of the present disclosure.

FIG. 9 is a flowchart illustrating an exemplary method implemented in a communication system, such as, for example, the communication system of FIGS. 7 and 8, in accordance with one embodiment. The communication system may include a host computer 24, a network node 16 and a UE 22, which may be those described with reference to FIG. 8. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the UE 22 (Block S104). In an optional third step, the network node 16 transmits to the UE 22 the user data which was carried in the transmission that the host computer 24 initiated, in accordance with the teachings of the embodiments described throughout this disclosure (Block S106). In an optional fourth step, the UE 22 executes a client application, such as, for example, the client application 92, associated with the host application 50 executed by the host computer 24 (Block S108).

FIG. 10 is a flowchart illustrating an exemplary method implemented in a communication system, such as, for example, the communication system of FIG. 7, in accordance with one embodiment. The communication system may include a host computer 24, a network node 16 and a UE 22, which may be those described with reference to FIGS. 7 and 8. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the UE 22 (Block S112). The transmission may pass via the network node 16, in accordance with the teachings of the embodiments described throughout this disclosure. In an optional third step, the UE 22 receives the user data carried in the transmission (Block S114).

FIG. 11 is a flowchart illustrating an exemplary method implemented in a communication system, such as, for example, the communication system of FIG. 7, in accordance with one embodiment. The communication system may include a host computer 24, a network node 16 and a UE 22, which may be those described with reference to FIGS. 7 and 8. In an optional first step of the method, the UE 22 receives input data provided by the host computer 24 (Block S116). In an optional substep of the first step, the UE 22 executes the client application 92, which provides the user data in reaction to the received input data provided by the host computer 24 (Block S118). Additionally or alternatively, in an optional second step, the UE 22 provides user data (Block S120). In an optional substep of the second step, the UE provides the user data by executing a client application, such as, for example, client application 92 (Block S122). In providing the user data, the executed client application 92 may further consider user input received from the user. Regardless of the specific manner in which the user data was provided, the UE 22 may initiate, in an optional third substep, transmission of the user data to the host computer 24 (Block S124). In a fourth step of the method, the host computer 24 receives the user data transmitted from the UE 22, in accordance with the teachings of the embodiments described throughout this disclosure (Block S126).

FIG. 12 is a flowchart illustrating an exemplary method implemented in a communication system, such as, for example, the communication system of FIG. 7, in accordance with one embodiment. The communication system may include a host computer 24, a network node 16 and a UE 22, which may be those described with reference to FIGS. 7 and 8. In an optional first step of the method, in accordance with the teachings of the embodiments described throughout this disclosure, the network node 16 receives user data from the UE 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 13:
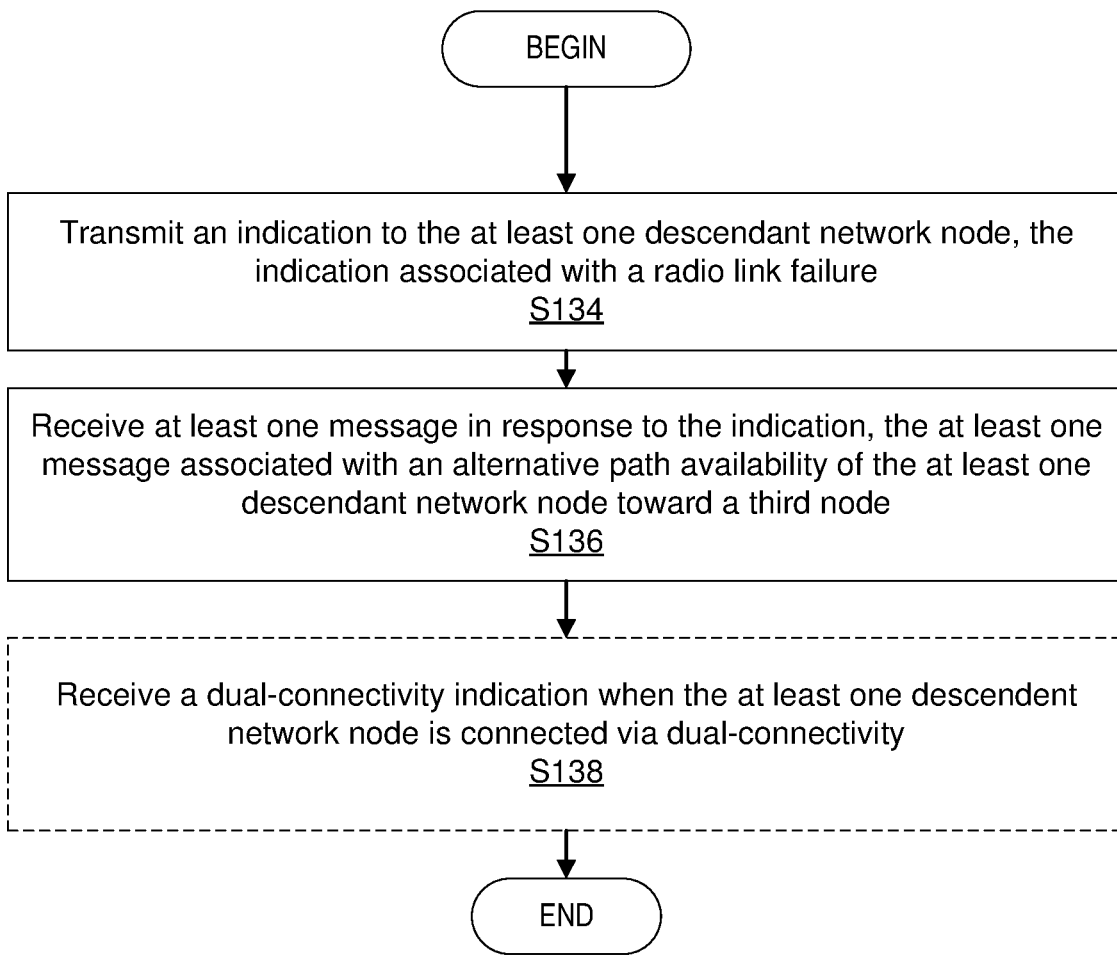
FIG. 13 is a flowchart of an exemplary process in a network node (e.g., a parent IAB node) according to some embodiments of the present disclosure.

FIG. 13 is a flowchart of an exemplary process in a network node 16 (e.g., parent IAB node) for preventing reestablishment at descendant nodes with no alternative paths in Integrated Access Backhaul (IAB) networks according to some embodiments of the present disclosure. One or more Blocks and/or functions and/or methods performed by the network node 16 may be performed by one or more elements of network node 16 such as by indication unit 32 in processing circuitry 68, processor 70, radio interface 62, etc. according to the example method. The example method includes network node 16 configured to communicate with at least one descendant node over a backhaul network, transmitting (Block S134), such as via indication unit 32, processing circuitry 68, processor 70, communication interface 60 and/or radio interface 62, an indication to the at least one descendant network node, the indication associated with a radio link failure. The method includes network node 16 receiving (Block S136), such as via indication unit 32, processing circuitry 68, processor 70, communication interface 60 and/or radio interface 62, at least one message in response to the indication, the at least one message associated with an alternative path availability of the at least one descendant network node toward a third node (e.g., donor node). The method includes optionally, receiving (Block S138), such as via indication unit 32, processing circuitry 68, processor 70, communication interface 60 and/or radio interface 62, a dual-connectivity indication (e.g., from donor node or descendent node) when the at least one descendent network node is connected via dual-connectivity.

In some embodiments, the at least one message comprises at least one of: an alternative path availability flag indicating whether the at least one descendant network node has an alternative path toward the third node; an indication of at least one cell that the at least one descendant network node's distributed unit (DU) is hosting; and a dedicated preamble that the network node's mobile termination (MT) is allowed to use to attempt a random access (RA) for radio resource control (RRC) re-establishment procedure via the at least one descendant network node. In some embodiments, the network node 16 is a parent IAB node and the third node is a donor IAB node.

Figure 14:
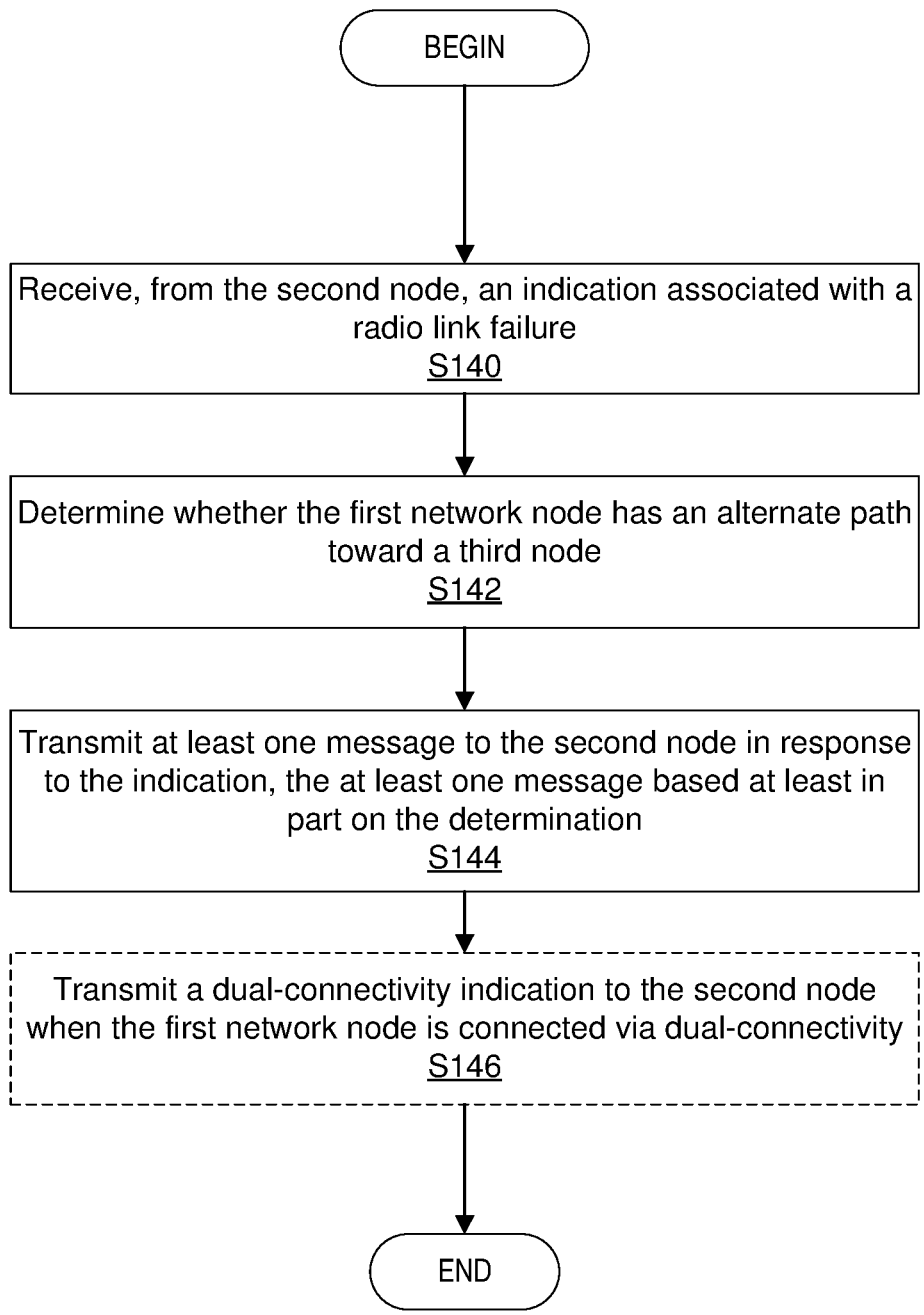
FIG. 14 is a flowchart of an exemplary process in a network node (e.g., a descendant IAB node) according to some embodiments of the present disclosure.

FIG. 14 is a flowchart of an exemplary process in a network node 16 for preventing reestablishment at descendant nodes with no alternative paths in Integrated Access Backhaul (IAB) networks according to some embodiments of the present disclosure. One or more Blocks and/or functions and/or methods performed by the network node 16 may be performed by one or more elements of network node 16 such as by report unit 34 in processing circuitry 68, processor 70, radio interface 62, etc. according to the example method. The example method includes network node 16 configured to communicate with a second node over a backhaul network, receiving (Block S140), such as via report unit 34, processing circuitry 68, processor 70, communication interface 60 and/or radio interface 62, from the second node, an indication associated with a radio link failure. The method includes determining (Block S142), such as via report unit 34, processing circuitry 68, processor 70, communication interface 60 and/or radio interface 62, whether the first network node has an alternate path toward a third node. The method includes transmitting (Block S144), such as via report unit 34, processing circuitry 68, processor 70, communication interface 60 and/or radio interface 62, at least one message to the second node in response to the indication, the at least one message based at least in part on the determination. The method includes optionally, transmitting (Block S146), such as via report unit 34, processing circuitry 68, processor 70, communication interface 60 and/or radio interface 62, a dual-connectivity indication to the second node when the first network node is connected via dual-connectivity.

In some embodiments, the at least one message comprises at least one of: an alternative path availability flag indicating whether the first network node has an alternative path toward the third node; an indication of at least one cell that the first network node's distributed unit (DU) is hosting; and a dedicated preamble that the second node's mobile termination (MT) is allowed to use to attempt a random access (RA) for radio resource control (RRC) re-establishment procedure via the first network node. In some embodiments, the network node 16 is a descendant IAB node, the second node is a parent IAB node and the third node is a donor IAB node.

FIG. 15 is a flowchart of an exemplary process in a network node 16 (e.g., parent IAB node) for preventing reestablishment at descendant nodes with no alternative paths in Integrated Access Backhaul (IAB) networks according to some embodiments of the present disclosure. One or more Blocks and/or functions and/or methods performed by the network node 16 may be performed by one or more elements of network node 16 such as by indication unit 32 in processing circuitry 68, processor 70, communication interface 60, radio interface 62, etc. according to the example method. The example method includes transmitting (Block S148), such as by indication unit 32 in processing circuitry 68, processor 70, communication interface 60 and/or radio interface 62, an indication to the at least one descendant network node, the indication associated with a radio link failure. The method includes receiving (Block S150), such as by indication unit 32 in processing circuitry 68, processor 70, communication interface 60 and/or radio interface 62, an indication to the at least one descendant network node, at least one message in response to the indication, the at least one message associated with an alternative path availability of the at least one descendant network node toward a third network node.

In some embodiments, the at least one message indicates at least one of: at least one path that is not available as an alternative path; and at least one path that is available as the alternative path. In some embodiments, the at least one message comprises an alternative path availability flag indicating whether the at least one descendant network node has the alternative path toward the third network node. In some embodiments, the at least one message comprises an indication of at least one cell that a distributed unit, DU, in the at least one descendant network node is hosting. In some embodiments, the method further includes considering, such as by indication unit 32 in processing circuitry 68, processor 70, communication interface 60 and/or radio interface 62, an indication to the at least one descendant network node, at least one first cell in the at least one cell as a candidate for re-establishment.

In some embodiments, considering the at least one first cell as the candidate for re-establishment when the at least one first cell comprises a strongest cell, the strongest cell having a strongest signal level as compared to any other cells the network node measures. In some embodiments, considering the at least one first cell as the candidate for re-establishment when the at least one first cell comprises a strongest cell, the strongest cell having a strongest signal level among cells in the at least one cell indicated in the at least one message. In some embodiments, the method further includes considering, such as by indication unit 32 in processing circuitry 68, processor 70, communication interface 60 and/or radio interface 62, an indication to the at least one descendant network node, none of the cells in the at least one cell as a candidate for re-establishment.

In some embodiments, the at least one cell indicated in the at least one message comprises a first set of cells and a second set of cells; and the method further comprises: considering, such as by indication unit 32 in processing circuitry 68, processor 70, communication interface 60 and/or radio interface 62, an indication to the at least one descendant network node, none of the first set of cells as a candidate for re-establishment; and considering, such as by indication unit 32 in processing circuitry 68, processor 70, communication interface 60 and/or radio interface 62, an indication to the at least one descendant network node, the second set of cells in the at least one cell as the candidate for re-establishment. In some embodiments, the at least one message comprises a dedicated preamble; and the method further comprises using, such as by indication unit 32 in processing circuitry 68, processor 70, communication interface 60 and/or radio interface 62, an indication to the at least one descendant network node, the dedicated preamble to attempt a random access, RA, for a radio resource control, RRC, re-establishment procedure via the at least one descendant network node.

In some embodiments, the network node is a parent Integrated Access Backhaul, IAB, node and the third network node is a donor IAB node. In some embodiments, the method further includes receiving, such as by indication unit 32 in processing circuitry 68, processor 70, communication interface 60 and/or radio interface 62, an indication to the at least one descendant network node, a dual-connectivity indication when the at least one descendent network node is connected via dual-connectivity.

FIG. 16 is a flowchart of an exemplary process in a network node 16 for preventing reestablishment at descendant nodes with no alternative paths in Integrated Access Backhaul (IAB) networks according to some embodiments of the present disclosure. One or more Blocks and/or functions and/or methods performed by the network node 16 may be performed by one or more elements of network node 16 such as by report unit 34 in processing circuitry 68, processor 70, radio interface 62, etc. according to the example method. The example method includes receiving (Block S152), such as by report unit 34 in processing circuitry 68, processor 70, communication interface 60 and/or radio interface 62, from the second network node, an indication associated with a radio link failure. The method includes transmitting (Block S154), such as by report unit 34 in processing circuitry 68, processor 70, communication interface 60 and/or radio interface 62, at least one message to the second network node in response to the indication, the at least one message associated with an alternative path availability of the first network node toward a third network node.

In some embodiments, the at least one message indicates at least one of: at least one path that is not available as an alternative path; and at least one path that is available as the alternative path. In some embodiments, the method further includes determining, such as by report unit 34 in processing circuitry 68, processor 70, communication interface 60 and/or radio interface 62, whether the first network node has the alternative path toward the third network node, the at least one message being based at least in part on the determination. In some embodiments, the at least one message comprises an alternative path availability flag indicating whether the first network node has the alternative path toward the third network node. In some embodiments, the at least one message comprises an indication of at least one cell that a distributed unit, DU, in the first network node is hosting. In some embodiments, the at least one cell indicated in the at least one message transmitted to the second network node comprises: at least one first cell to be considered by the second network node as a candidate for re-establishment.

In some embodiments, the at least one first cell is to be considered as the candidate for re-establishment when the at least one first cell comprises a strongest cell, the strongest cell having a strongest signal level as compared to any other cells the second network node measures. In some embodiments, the at least one first cell is to be considered as the candidate for re-establishment when the at least one first cell comprises a strongest cell, the strongest cell having a strongest signal level among cells in the at least one cell indicated in the at least one message. In some embodiments, none of the cells in the at least one cell indicated in the at least one message is to be considered as a candidate for re-establishment. In some embodiments, the at least one cell indicated in the at least one message comprises a first set of cells and a second set of cells, none of the first set of cells are to be considered by the second network node as a candidate for re-establishment and the second set of cells are to be considered by the second network node as the candidate for re-establishment.

In some embodiments, the at least one message comprises a dedicated preamble for the second network node to perform a random access, RA, for a radio resource control, RRC, re-establishment procedure via the first network node.

In some embodiments, the second network node is a parent Integrated Access Backhaul, IAB, node and the third network node is a donor IAB node.

Figure 17:
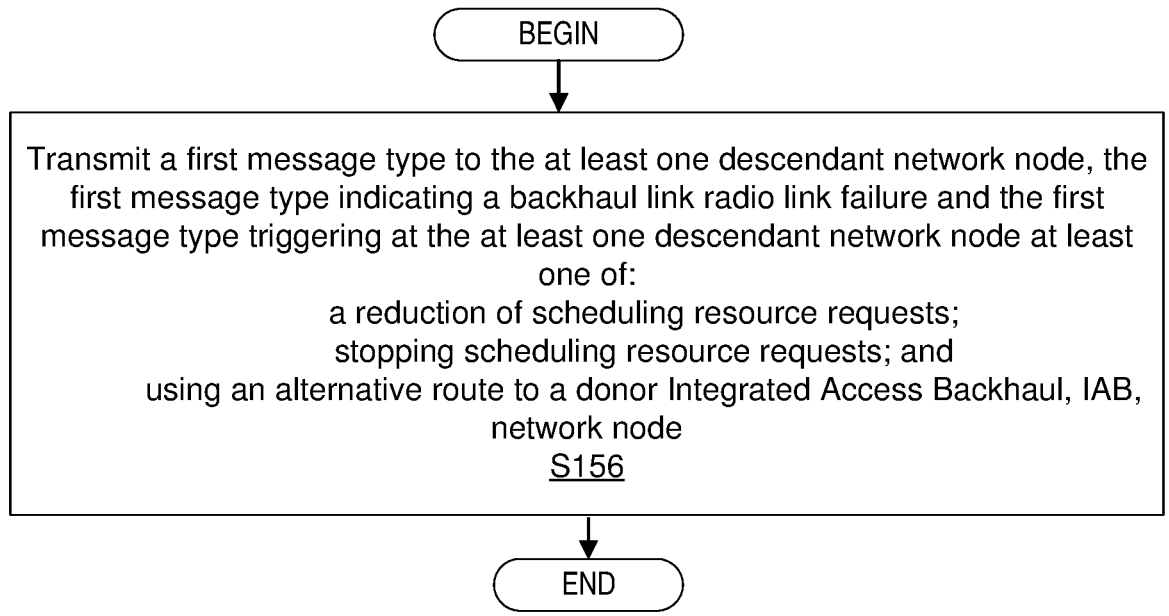
FIG. 17 is a flowchart of an exemplary process in a network node (e.g., a parent IAB node) according to some embodiments of the present disclosure.

FIG. 17 is a flowchart of an exemplary process in a network node 16. One or more Blocks and/or functions and/or methods performed by the network node 16 may be performed by one or more elements of network node 16 such as by processing circuitry 68, processor 70, communication interface 60, radio interface 62, etc. according to the example method. The example method includes transmitting (Block S156), such as by processing circuitry 68, processor 70, communication interface 60 and/or radio interface 62, a first message type to the at least one descendant network node, the first message type indicating a backhaul link radio link failure and the first message type triggering at the at least one descendant network node at least one of: a reduction of scheduling resource requests; stopping scheduling resource requests; and using an alternative route to a donor Integrated Access Backhaul, IAB, network node.

In some embodiments, the method further includes transmitting, such as by processing circuitry 68, processor 70, communication interface 60 and/or radio interface 62, a second message type to the at least one descendant network node, the second message type indicating the backhaul link is recovered and the second message type triggering resumption of the scheduling resource requests. In some embodiments, the scheduling resource requests comprise at least one of a scheduling request, SR, and a buffer status report, BSR.

Figure 18:
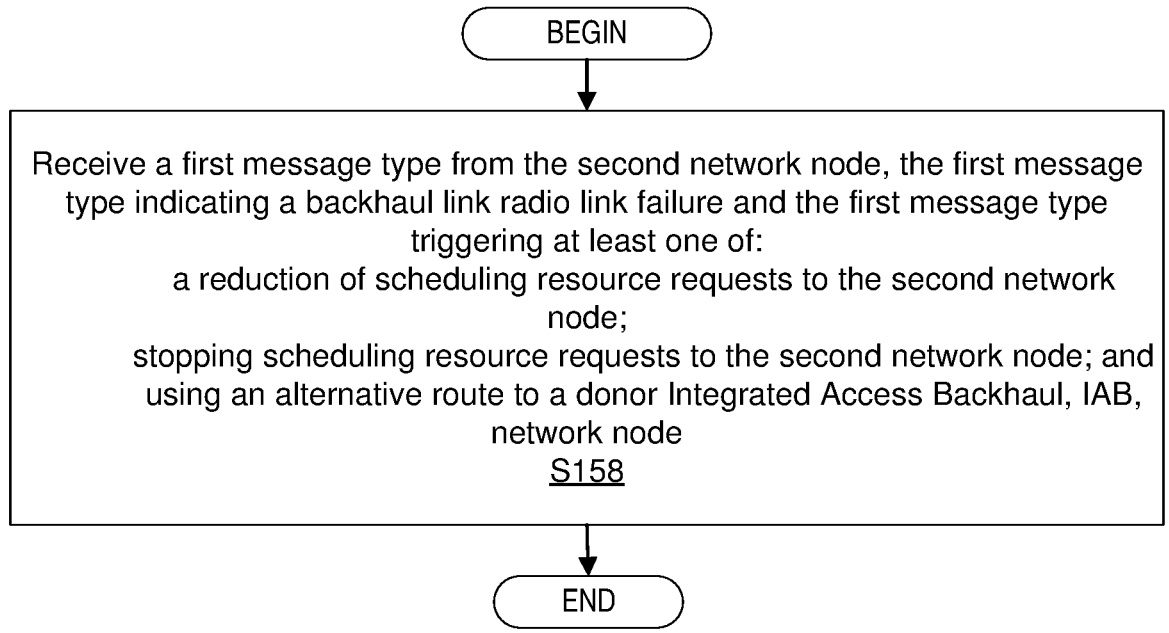
FIG. 18 is a flowchart of an exemplary process in a network node (e.g., a descendant IAB node) according to some embodiments of the present disclosure.

FIG. 18 is a flowchart of an exemplary process in a network node 16. One or more Blocks and/or functions and/or methods performed by the network node 16 may be performed by one or more elements of network node 16 such as by processing circuitry 68, processor 70, communication interface 60, radio interface 62, etc. according to the example method. The example method includes receiving (Block S158), such as by processing circuitry 68, processor 70, communication interface 60 and/or radio interface 62, a first message type from the second network node, the first message type indicating a backhaul link radio link failure and the first message type triggering at least one of: a reduction of scheduling resource requests to the second network node, such as by processing circuitry 68, processor 70, communication interface 60 and/or radio interface 62; stopping scheduling resource requests to the second network node, such as by processing circuitry 68, processor 70, communication interface 60 and/or radio interface 62; and using, such as by processing circuitry 68, processor 70, communication interface 60 and/or radio interface 62, an alternative route to a donor Integrated Access Backhaul, IAB, network node.

In some embodiments, the method further includes receiving, such as by processing circuitry 68, processor 70, communication interface 60 and/or radio interface 62, a second message type from the second network node, the second message type indicating the backhaul link is recovered and the second message type triggering resumption of the scheduling resource requests, such as by processing circuitry 68, processor 70, communication interface 60 and/or radio interface 62. In some embodiments, the scheduling resource requests comprise at least one of a scheduling request, SR, and a buffer status report, BSR.

Having described the general process flow of arrangements of the disclosure and having provided examples of hardware and software arrangements for implementing the processes and functions of the disclosure, the sections below provide details and examples of arrangements for preventing reestablishment at descendant nodes with no alternative paths in Integrated Access Backhaul (IAB) networks, which may be implemented by the network node 16, UE 22 and/or host computer 24.

Figure 19:
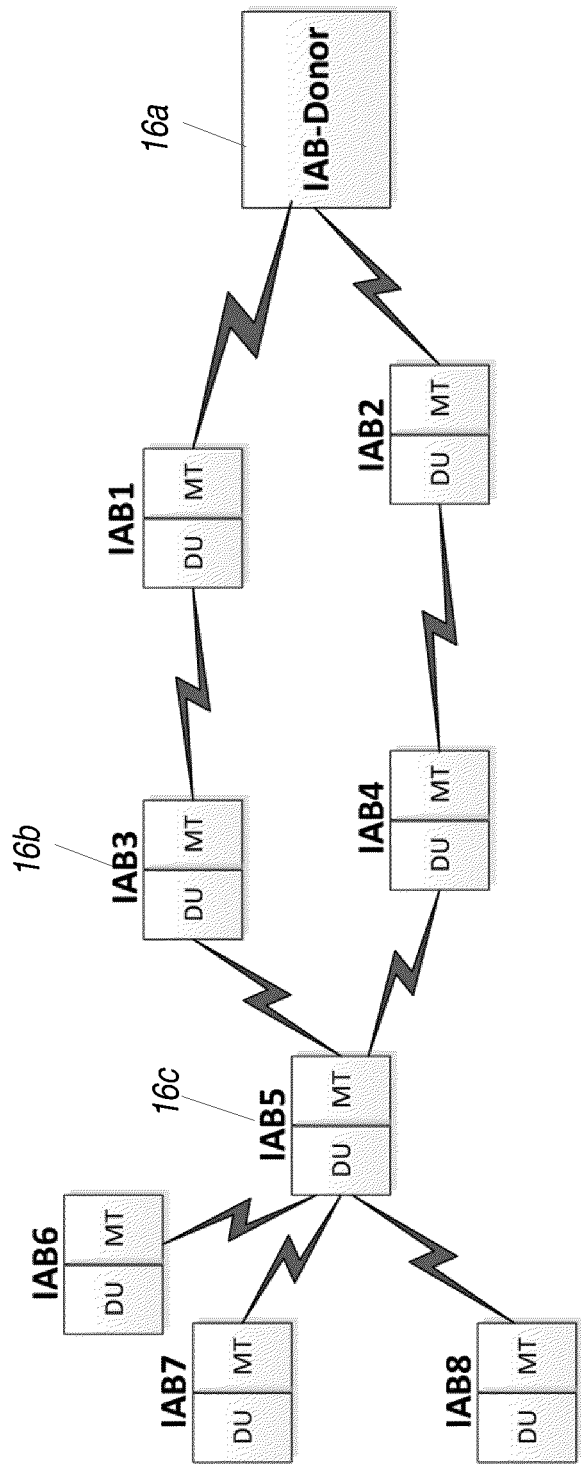
FIG. 19 illustrates an example of parent IAB node 3 with BH RLF on link with IAB1 where descendent node IAB 5 has an alternative path according to some embodiments of the present disclosure.
Figure 20:
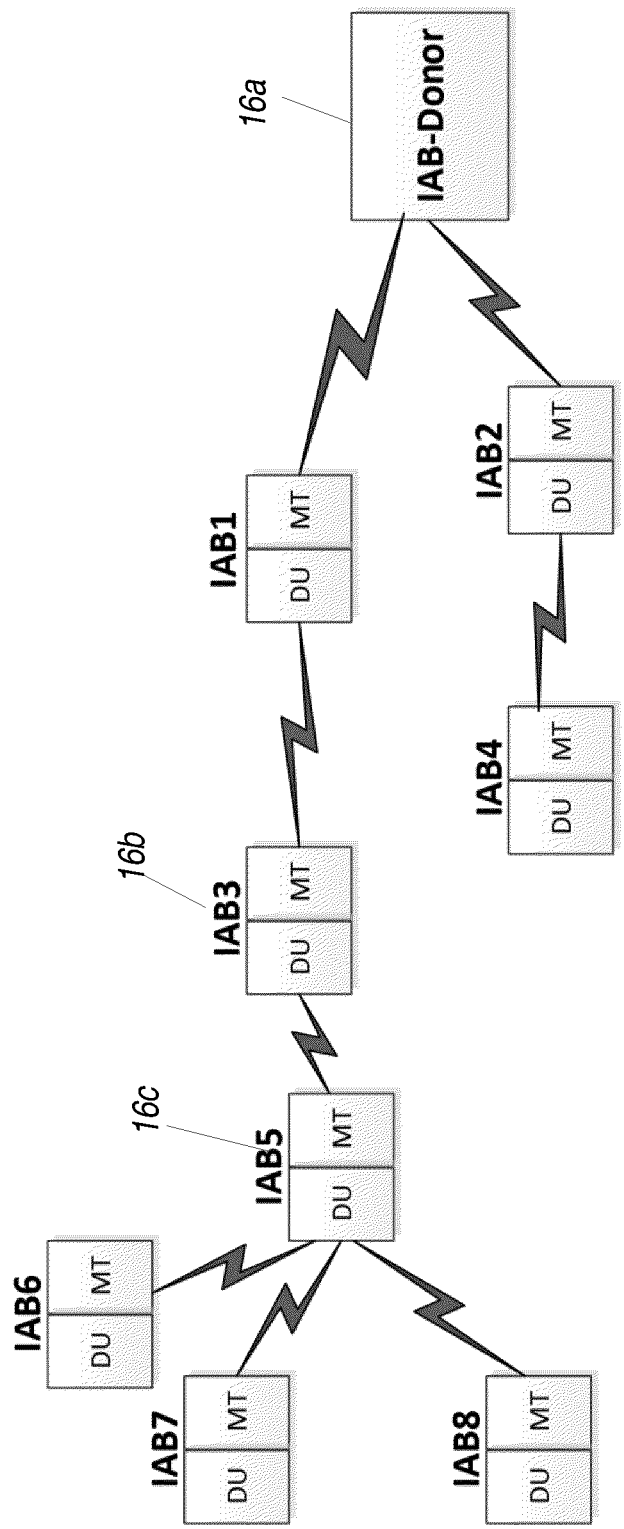
FIG. 20 illustrates an example of parent IAB node 3 with BH RLF on link with IAB1 where descendent node IAB 5 does not have an alternate path according to some embodiments of the present disclosure.

Example network scenarios shown in FIG. 19 and FIG. 20 are used to illustrate some embodiments of the procedure proposed. When IAB3 (in FIG. 19) (e.g., parent network node 16b) detects some type of link failure towards its parent node IAB1 e.g., radio link failure, IAB3 (e.g., parent network node 16b) sends a first indication (i.e., Type 2—"BH RLF detected, trying to recover") to descendant node IAB5 (e.g., descendent network node 16c). Since the child/descendent IAB node (i.e., IAB5 in FIG. 19) has an alternative path toward the IAB donor (e.g., donor network node 16a), IAB5 (e.g., descendent network node 16c) may respond with a message that includes one or more of:
1: (optional) An alternate path availability indicator flag indicating the child node (e.g., IAB5, descendent network node 16c) has alternative path;
2. List of cells that the child IAB node's DU (i.e., IAB5-DU) (e.g., descendent network node 16c) is hosting; and/or
3: (optional) a dedicated preamble that the parent node's MT (i.e., IAB3-MT)) (e.g., parent network node 16b) could use to try Random Access for es-establishment procedure via the child IAB node (i.e., IAB5, descendent network node 16c).

In one realization the absence of the alternate path availability flag can be an implicit indication that the IAB node (e.g., descendent network node 16c) has (or does not have) an alternate path. In another realization, the child node (e.g., descendent network node 16c) must explicitly indicate that it has an alternate path by including the flag (e.g., setting the value to TRUE).

In one realization (a), the parent node (e.g., parent network node 16b) will consider one of the cells indicated as the candidate for re-establishment, only if that cell has the strongest signal level (e.g., reference signal received power (RSRP), reference signal received quality (RSRQ), etc.) as compared to any other cell that the parent node's MT can measure at that time. In another realization (b), the parent node (e.g., parent network node 16b) will consider the strongest cell (in terms of measured signal level) among the cells indicated as the candidate for RRC re-establishment, even if the parent node could measure cells other than the indicated cells that have stronger signal levels. Whether the parent node (e.g., parent network node 16b) applies behavior a or b can be based on e.g., IAB implementation, can be configurable, or it can be pre-configured and/or specified in 3GPP specifications (e.g., RRC specifications).

In another scenario shown in FIG. 20, the child IAB node (i.e., IAB5, descendent network node 16c) has no alternative path toward the IAB Donor node (e.g., donor network node 16a) and has only one parent IAB node (i.e., IAB3, parent network node 16b). In this situation, when the child IAB node (i.e., IAB5, descendent network node 16c) receives a first indication (i.e., Type 2—"BH RLF detected, trying to recover") from its parent node (i.e., IAB3, parent network node 16b), the child node (i.e., IAB5, descendent network node 16c) may respond with a message that includes one or more of:
1: (optional) An indicator indicating that no alternate paths are available; and/or
2: A list of cell hosting by the child node's DU (indicating that the parent node's MT should not try to re-establish to one of these cells).

In one embodiment, the absence of the alternate path availability flag can be an implicit indication that the IAB node has no (or has an) alternate path. In another embodiment, the child node (i.e., IAB5, descendent network node 16c) must explicitly indicate that it has no alternate path by including the flag (e.g., setting the value to FALSE).

In some embodiments, the parent node (i.e., IAB3, parent network node 16b) may consider none of the cells indicated as the candidate for re-establishment, even if some of the cells have stronger signal levels (e.g., RSRP, RSRQ, etc.) as compared to any other cell that the parent node's MT can measure at that time.

In some embodiments, an approach can be envisioned where the child IAB node (e.g., descendent network node 16c) responds with two sets of cells, where cells indicated in one of the lists are not to be considered as candidate cells for RRC re-establishment by the parent node (e.g., parent network node 16b), while the cells indicated in the other list can be considered as candidate cells. For example, one such structure could be: {List1: {cell a, cell b, cell c}, List2: {cell x, cell y, cell z}}, where the List1 includes those cells that can be candidates for re-establishment, while list2 is includes those cells that are not.

In some embodiments, if a child IAB node (e.g., descendent network node 16c) is connected to the parent node (e.g., parent network node 16b) via dual connectivity, (e.g., NR-DC) then the parent IAB node is the Master or Secondary DU. The donor CU (e.g., donor network node 16a) (or CUs in case the two DUs are controlled by different donor CUs) is/are aware of this fact, but not necessarily the DU of the parent IAB node. In one embodiment, the IAB-DU (e.g., parent network node 16b) is informed whenever a descendant node (e.g., descendent network node 16c) gets connected via dual connectivity (e.g., an F1-AP message from the donor CU). Thus, only the indication of the list of cells is enough from the child IAB node in this case, because the parent IAB node could implicitly infer whether the child node has an alternate path or not.

Some embodiments provide a mechanism for preventing the IAB node experiencing BH RLF to avoid reestablishing at its descendant nodes that have no alternative paths towards the Donor node.

Some embodiments may include one or more of the following:

It is noted that the "nodes" referred to below may be IAB nodes.

Embodiment A1. A network node configured to communicate with at least one descendant node over a backhaul network, the network node configured to, and/or comprising a radio interface and/or comprising processing circuitry configured to one or more of:
transmit an indication to the at least one descendant network node, the indication associated with a radio link failure;
receive at least one message in response to the indication, the at least one message associated with an alternative path availability of the at least one descendent network node toward a third node; and
optionally, receive a dual-connectivity indication when the at least one descendent network node is connected via dual-connectivity.

Embodiment A2. The network node of Embodiment A1, wherein the at least one message comprises at least one of:
an alternative path availability flag indicating whether the at least one descendent network node has an alternative path toward the third node;

an indication of at least one cell that the at least one descendant network node's distributed unit (DU) is hosting; and a dedicated preamble that the network node's mobile termination (MT) is allowed to use to attempt a random access (RA) for radio resource control (RRC) re-establishment procedure via the at least one descendant network node.

Embodiment A3. The network node of Embodiment A1, wherein the network node is a parent IAB node and the third node is a donor IAB node.

Embodiment B1. A method implemented in a network node configured to communicate with at least one descendant node over a backhaul network, the method comprising one or more of:

transmitting an indication to the at least one descendant network node, the indication associated with a radio link failure;

receiving at least one message in response to the indication, the at least one message associated with an alternative path availability of the at least one descendant network node toward a third node; and optionally, receiving a dual-connectivity indication when the at least one descendent network node is connected via dual-connectivity.

Embodiment B2. The method of Embodiment B1, wherein the at least one message comprises at least one of:

an alternative path availability flag indicating whether the at least one descendant network node has an alternative path toward the third node;

an indication of at least one cell that the at least one descendant network node's distributed unit (DU) is hosting; and a dedicated preamble that the network node's mobile termination (MT) is allowed to use to attempt a random access (RA) for radio resource control (RRC) re-establishment procedure via the at least one descendant network node.

Embodiment B3. The method of Embodiment B1, wherein the network node is a parent IAB node and the third node is a donor IAB node.

Embodiment C1. A first network node configured to communicate with a second node over a backhaul network, the first network node configured to, and/or comprising a radio interface and/or comprising processing circuitry configured to one or more of:

receive, from the second node, an indication associated with a radio link failure;

determine whether the first network node has an alternate path toward a third node;

transmit at least one message to the second node in response to the indication, the at least one message based at least in part on the determination; and optionally, transmit a dual-connectivity indication to the second node when the first network node is connected via dual-connectivity.

Embodiment C2. The first network node of Embodiment C1, wherein the at least one message comprises at least one of:

an alternative path availability flag indicating whether the first network node has an alternative path toward the third node;

an indication of at least one cell that the first network node's distributed unit (DU) is hosting; and a dedicated preamble that the second node's mobile termination (MT) is allowed to use to attempt a random access (RA) for radio resource control (RRC) re-establishment procedure via the first network node.

Embodiment C3. The first network node of any one of Embodiments C1 and C2, wherein the network node is a descendant IAB node, the second node is a parent IAB node and the third node is a donor IAB node.

Embodiment D1. A method implemented in a first network node that is configured to communicate with a second node over a backhaul network, the method comprising one or more of:

receiving, from the second node, an indication associated with a radio link failure;

determining whether the first network node has an alternate path toward a third node;

transmitting at least one message to the second node in response to the indication, the at least one message based at least in part on the determination; and optionally, transmit a dual-connectivity indication to the second node when the first network node is connected via dual-connectivity.

Embodiment D2. The method of Embodiment D1, wherein the at least one message comprises at least one of:

an alternative path availability flag indicating whether the first network node has an alternative path toward the third node;

an indication of at least one cell that the first network node's distributed unit (DU) is hosting; and a dedicated preamble that the second node's mobile termination (MT) is allowed to use to attempt a random access (RA) for radio resource control (RRC) re-establishment procedure via the first network node.

Embodiment D3. The method of any one of Embodiments D1 and D2, wherein the network node is a descendant IAB node, the second node is a parent IAB node and the third node is a donor IAB node.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3GPP | 3rd Generation Partnership Project |
| ACK | Acknowledgement |
| BSR | Buffer Status Report |

-continued

| Abbreviation | Explanation |
| --- | --- |
| CN | Core Network |
| CP | Control Plane |
| CU | Central Unit |
| DL | Downlink |
| DU | Distributed Unit |
| IAB | Integrated Access Backhaul |
| MAC | Medium Access Control |
| NACK | Negative ACK |
| PDCP | Packet Data Convergence Protocol |
| PDU | Protocol Data Unit |
| RLC | Radio Link Control |
| RRC | Radio Resource Control |
| SDU | Service Data Unit |
| SIB | System Information Block |
| SR | Scheduling Request |
| UE | User Equipment |
| UL | Uplink |
| UP | User Plane |

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims

The invention claimed is:

1. A method implemented in a network node configured to communicate with at least one descendant network node over a backhaul network, the method comprising:
transmitting an indication to the at least one descendant network node, the indication associated with a radio link failure;
receiving at least one message in response to the indication, the at least one message associated with an alternative path availability of the at least one descendant network node toward a third network node, the at least one message comprising an indication of at least one cell that a distributed unit, DU, in the at least one descendant network node is hosting; and
considering at least one first cell in the at least one cell as a candidate for re-establishment when the at least one first cell comprises a strongest cell having at least one of:
a strongest signal level as compared to any other cells the network node measures; and
a strongest signal level among cells in the at least one cell indicated in the at least one message.

2. The method of claim 1, wherein the at least one message indicates at least one of:
at least one path that is not available as an alternative path; and
at least one path that is available as the alternative path.

3. The method of claim 1, wherein the at least one message comprises an alternative path availability flag indicating whether the at least one descendant network node has the alternative path toward the third network node.

4. The method of claim 1, wherein the at least one message comprises a dedicated preamble; and
the method further comprises using the dedicated preamble to attempt a random access, RA, for a radio resource control, RRC, re-establishment procedure via the at least one descendant network node.

5. A method implemented in a first network node that is configured to communicate with a second network node over a backhaul network, the method comprising:
- receiving, from the second network node, an indication associated with a radio link failure; and
- transmitting at least one message to the second network node in response to the indication, the at least one message associated with an alternative path availability of the first network node toward a third network node, the at least one message comprising an indication of at least one cell that a distributed unit, DU, in the first network node is hosting, the at least one cell indicated in the at least one message transmitted to the second network node comprising at least one first cell to be considered by the second network node as a candidate for re-establishment when the at least one first cell comprises a strongest cell having at least one of:
  - a strongest signal level as compared to any other cells the second network node measures; and
  - a strongest signal level among cells in the at least one cell indicated in the at least one message.

6. The method of claim 5, wherein the at least one message indicates at least one of:
- at least one path that is not available as an alternative path; and
- at least one path that is available as the alternative path.

7. The method of claim 5, further comprising:
- determining whether the first network node has the alternative path toward the third network node, the at least one message being based at least in part on the determination.

8. The method of claim 5, wherein the at least one message comprises an alternative path availability flag indicating whether the first network node has the alternative path toward the third network node.

9. A network node configured to communicate with at least one descendant network node over a backhaul network, the network node comprising processing circuitry, the processing circuitry configured to cause the network node to:
- transmit an indication to the at least one descendant network node, the indication associated with a radio link failure;
- receive at least one message in response to the indication, the at least one message associated with an alternative path availability of the at least one descendant network node toward a third network node, the at least one message comprising an indication of at least one cell that a distributed unit, DU, in the at least one descendant network node is hosting; and
- consider at least one first cell in the at least one cell as a candidate for re-establishment when the at least one first cell comprises a strongest cell, the strongest cell having at least one of:
  - a strongest signal level as compared to any other cells the network node measures; and
  - a strongest signal level among cells in the at least one cell indicated in the at least one message.

10. The network node of claim 9, wherein the at least one message indicates at least one of:
- at least one path that is not available as an alternative path; and
- at least one path that is available as the alternative path.

11. The network node of claim 9, wherein the at least one message comprises an alternative path availability flag indicating whether the at least one descendant network node has the alternative path toward the third network node.

12. A first network node that is configured to communicate with a second network node over a backhaul network, the first network node comprising processing circuitry, the processing circuitry configured to cause the first network node to:
- receive, from the second network node, an indication associated with a radio link failure; and
- transmit at least one message to the second network node in response to the indication, the at least one message associated with an alternative path availability of the first network node toward a third network node, the at least one message comprising an indication of at least one cell that a distributed unit, DU, in the first network node is hosting, the at least cell indicated in the at least one message transmitted to the second network node comprising at least one first cell to be considered by the second network node as a candidate for re-establishment when the at least one first cell comprises a strongest cell, the strongest cell having at least one of:
  - a strongest signal level as compared to any other cells the second network node measures; and
  - the strongest cell having a strongest signal level among cells in the at least one cell indicated in the at least one message.

13. The first network node of claim 12, wherein the at least one message indicates at least one of:
- at least one path that is not available as an alternative path; and
- at least one path that is available as the alternative path.

14. The first network node of claim 12, wherein the processing circuitry is further configured to cause the first network node to:
- determine whether the first network node has the alternative path toward the third network node, the at least one message being based at least in part on the determination.

15. The first network node of claim 12, wherein the at least one message comprises an alternative path availability flag indicating whether the first network node has the alternative path toward the third network node.

* * * * *